US012588705B2

(12) United States Patent
Zhao et al.

(10) Patent No.: US 12,588,705 B2
(45) Date of Patent: *Mar. 31, 2026

(54) HEATING ASSEMBLY, VAPORIZER, AND ELECTRONIC VAPORIZATION DEVICE

(71) Applicant: SHENZHEN SMOORE TECHNOLOGY LIMITED, Guangdong (CN)

(72) Inventors: Yueyang Zhao, Shenzhen (CN); Ming Lv, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 401 days.

This patent is subject to a terminal disclaimer.

(21) Appl. No.: 18/091,991

(22) Filed: Dec. 30, 2022

(65) Prior Publication Data

US 2023/0210181 A1 Jul. 6, 2023

Related U.S. Application Data

(63) Continuation of application No. PCT/CN2022/092863, filed on May 13, 2022.

(30) Foreign Application Priority Data

Dec. 30, 2021 (WO) ................ PCT/CN2021/143259

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/44* (2020.01); *A24F 40/485* (2020.01); *H05B 3/06* (2013.01); *H05B 2203/021* (2013.01)

(58) Field of Classification Search
CPC ........................................................ A24F 40/40
(Continued)

(56) References Cited

U.S. PATENT DOCUMENTS

2017/0105455 A1 4/2017 Qiu
2017/0224018 A1 8/2017 Li et al.
(Continued)

FOREIGN PATENT DOCUMENTS

CN 105192894 A 12/2015
CN 105919164 A 9/2016
(Continued)

OTHER PUBLICATIONS

English Translation of CN-108158040-A (Year: 2025).*
(Continued)

*Primary Examiner* — Philip Y Louie
*Assistant Examiner* — Sonny V Nguyen
(74) *Attorney, Agent, or Firm* — Leydig, Voit & Mayer, Ltd.

(57) ABSTRACT

A heating assembly for an electronic vaporization device having an aerosol-generation substrate is disclosed. The heating assembly comprises a first substrate comprising a first surface and a second surface arranged opposite to each other, and a second substrate, comprising a third surface and a fourth surface arranged opposite to each other. The second surface and the third surface are arranged opposite to each other to form a gap having a capillary effect and a gradually changing height. An edge of the first substrate is provided with a liquid inlet formed thereon or by the edge of the first substrate with another component. The gap communicates the plurality of second micropores and the liquid inlet. The second substrate comprises a plurality of second micropores configured to guide the aerosol-generation substrate from the gap to the fourth surface.

24 Claims, 7 Drawing Sheets

(51) Int. Cl.

| | |
|---|---|
| ***A24F 40/44*** | (2020.01) |
| ***A24F 40/485*** | (2020.01) |
| ***H05B 3/06*** | (2006.01) |

(58) Field of Classification Search
USPC .............................................................. 40/44
See application file for complete search history.

(56) References Cited

U.S. PATENT DOCUMENTS

| | | | |
|---|---|---|---|
| 2018/0154090 A1 | 6/2018 | Anderson et al. | |
| 2018/0360112 A1 | 12/2018 | Qiu | |
| 2019/0246692 A1 | 8/2019 | Li et al. | |
| 2019/0297946 A1 | 10/2019 | Fu et al. | |
| 2020/0060344 A1 | 2/2020 | Tan et al. | |
| 2020/0214361 A1 | 7/2020 | Zhao et al. | |
| 2020/0397052 A1 | 12/2020 | Pelz et al. | |
| 2022/0117305 A1 | 4/2022 | Zhang et al. | |
| 2023/0320423 A1 | 10/2023 | Shi et al. | |

FOREIGN PATENT DOCUMENTS

| | | | | | |
|---|---|---|---|---|---|
| CN | 108158039 | A | | 6/2018 | |
| CN | 108158040 | A | * | 6/2018 | ........... H05B 1/0244 |
| CN | 108185536 | A | | 6/2018 | |
| CN | 207855026 | U | | 9/2018 | |
| CN | 109363248 | A | | 2/2019 | |
| CN | 109414078 | A | | 3/2019 | |
| CN | 109770438 | A | | 5/2019 | |
| CN | 109770439 | A | | 5/2019 | |
| CN | 110384258 | A | | 10/2019 | |
| CN | 209498589 | U | | 10/2019 | |
| CN | 110447959 | A | | 11/2019 | |
| CN | 110558632 | A | | 12/2019 | |
| CN | 110623308 | A | | 12/2019 | |
| CN | 110934343 | A | | 3/2020 | |
| CN | 111109665 | A | | 5/2020 | |
| CN | 210432836 | U | | 5/2020 | |
| CN | 111436664 | A | | 7/2020 | |
| CN | 210929637 | U | | 7/2020 | |
| CN | 211746945 | U | | 10/2020 | |
| CN | 111989004 | A | | 11/2020 | |
| CN | 112021671 | A | | 12/2020 | |
| CN | 112021672 | A | | 12/2020 | |
| CN | 112089105 | A | | 12/2020 | |
| CN | 112120291 | A | | 12/2020 | |
| CN | 112293801 | A | | 2/2021 | |
| CN | 212464919 | U | | 2/2021 | |
| CN | 112841745 | A | | 5/2021 | |
| CN | 113115987 | A | | 7/2021 | |
| CN | 213639660 | U | | 7/2021 | |
| CN | 113331484 | A | | 9/2021 | |
| CN | 214127012 | U | | 9/2021 | |
| CN | 113508924 | A | * | 10/2021 | ........... A24F 40/485 |
| CN | 214431782 | U | | 10/2021 | |
| CN | 113576038 | A | | 11/2021 | |
| CN | 113598436 | A | | 11/2021 | |
| CN | 113615887 | A | | 11/2021 | |
| CN | 113647696 | A | | 11/2021 | |
| CN | 113662250 | A | | 11/2021 | |
| CN | 214629849 | U | | 11/2021 | |
| CN | 214710349 | U | | 11/2021 | |
| CN | 214898758 | U | | 11/2021 | |
| CN | 214903781 | U | | 11/2021 | |
| CN | 113768192 | A | | 12/2021 | |
| CN | 113826962 | A | | 12/2021 | |
| CN | 215075503 | U | | 12/2021 | |
| CN | 215075542 | U | | 12/2021 | |
| CN | 215224778 | U | | 12/2021 | |
| CN | 215303052 | U | | 12/2021 | |
| CN | 113951572 | A | | 1/2022 | |
| CN | 215992753 | U | | 3/2022 | |
| CN | 216019130 | U | | 3/2022 | |
| CN | 114287676 | A | | 4/2022 | |
| CN | 114365870 | A | * | 4/2022 | ............ A24F 40/48 |
| CN | 114451586 | A | | 5/2022 | |
| CN | 216453382 | U | | 5/2022 | |
| CN | 114794568 | A | | 7/2022 | |
| CN | 114794571 | A | | 7/2022 | |
| CN | 114794576 | A | | 7/2022 | |
| CN | 114794577 | A | | 7/2022 | |
| CN | 114794578 | A | | 7/2022 | |
| CN | 114794579 | A | | 7/2022 | |
| CN | 114916708 | A | | 8/2022 | |
| CN | 218682034 | U | | 3/2023 | |
| CN | 218921698 | U | | 4/2023 | |
| CN | 116406850 | A | | 7/2023 | |
| CN | 117652718 | A | | 3/2024 | |
| CN | 220800051 | U | | 4/2024 | |
| CN | 220800052 | U | | 4/2024 | |
| CN | 221265251 | U | | 7/2024 | |
| EP | 3545779 | A1 | | 10/2019 | |
| EP | 3620071 | A1 | | 3/2020 | |
| EP | 3711599 | A1 | | 9/2020 | |
| EP | 4205582 | A2 | | 7/2023 | |
| JP | 2008104966 | A | | 5/2008 | |
| WO | 2014037794 | A2 | | 3/2014 | |
| WO | 2017214879 | A1 | | 12/2017 | |
| WO | 2018161254 | A1 | | 9/2018 | |
| WO | 2019035056 | A1 | | 2/2019 | |
| WO | 2021056195 | A1 | | 4/2021 | |
| WO | 2021083130 | A1 | | 5/2021 | |
| WO | 2021104151 | A1 | | 6/2021 | |
| WO | 2021120802 | A1 | | 6/2021 | |
| WO | 2021142640 | A1 | | 7/2021 | |
| WO | 2021143328 | A1 | | 7/2021 | |
| WO | 2021163950 | A1 | | 8/2021 | |
| WO | 2021169654 | A1 | | 9/2021 | |
| WO | 2021194048 | A1 | | 9/2021 | |
| WO | 2021198649 | A1 | | 10/2021 | |
| WO | 2021217292 | A1 | | 11/2021 | |
| WO | 2021243843 | A1 | | 12/2021 | |
| WO | 2021244543 | A1 | | 12/2021 | |
| WO | WO-2021240384 | A1 | * | 12/2021 | ............ A24F 40/46 |
| WO | 2022033376 | A1 | | 2/2022 | |
| WO | 2022056865 | A1 | | 3/2022 | |
| WO | 2022077359 | A1 | | 4/2022 | |
| WO | 2022170425 | A1 | | 8/2022 | |
| WO | 2022179300 | A2 | | 9/2022 | |
| WO | 2022179642 | A2 | | 9/2022 | |
| WO | 2023000799 | A1 | | 1/2023 | |

OTHER PUBLICATIONS

English Translation of WO2021240384A1 (Year: 2025).*
English Translation of CN113508924A (Year: 2025).*
English Translation of CN114365870A (Year: 2025).*
Chinese Patent Office, Office Action in Chinese Patent Application No. 202210524026.0 (Dec. 19, 2024).
Chinese Patent Office, Notification of grant of patent right for invention in Chinese Patent Application No. 202210524026.0.
Chinese Patent Office, Office Action in Chinese Patent Application No. 202210524878.X (Jan. 16, 2025).
Chinese Patent Office, Office Action in Chinese Patent Application No. 202111656304.X (Mar. 13, 2025).
Chinese Patent Office, First Office Action in Chinese Patent Application No. 202111681913.0 (Aug. 16, 2024).
Chinese Patent Office, Second Office Action in Chinese Patent Application No. 202111681913.0 (Jan. 22, 2025).
Chinese Patent Office, Notification of grant of patent right for invention in Chinese Patent Application No. 202111681913.0 (Mar. 25, 2025).
Patent Cooperation Treaty, International Search Report and Written Opinion, International Application No. PCT/CN2022/129354 (Jan. 20, 2023).
Patent Cooperation Treaty, International Search Report, International Application No. PCT/CN2022/092863 (Sep. 2, 2022).
Patent Cooperation Treaty, Written Opinion of the International Searching Authority, International Application No. PCT/CN2022/092863 (Sep. 2, 2022).

(56) References Cited

OTHER PUBLICATIONS

Patent Cooperation Treaty, International Search Report, International Application No. PCT/CN2021/143259 (Sep. 16, 2022).
Patent Cooperation Treaty, Written Opinion of the International Searching Authority, International Application No. PCT/CN2021/143259 (Sep. 16, 2022).
Patent Cooperation Treaty, International Search Report and Written Opinion, International Application No. PCT/CN2022/092858 (Jul. 28, 2022).
Patent Cooperation Treaty, International Search Report and Written Opinion, International Application No. PCT/CN2022/092856 (Sep. 30, 2022).
Chinese Patent Office, First Office Action in Chinese Patent Application No. 202290000072.4 (Nov. 23, 2022).
Patent Cooperation Treaty, International Search Report and Written Opinion, International Application No. PCT/CN2022/115306 (Nov. 15, 2022).
Patent Cooperation Treaty, International Search Report and Written Opinion, International Application No. PCT/CN2022/125701 (Dec. 27, 2022).
Chinese Patent Office, Office Action in Chinese Patent Application No. 202210524896.8 (Sep. 2, 2024).
Patent Cooperation Treaty, International Search Report and Written Opinion, International Application No. PCT/CN2022/143581 (Mar. 14, 2023).
European Patent Office, Search Report in European Patent Application No. 22913673.4 (Mar. 14, 2025).
Patent Cooperation Treaty, International Search Report and Written Opinion, International Application No. PCT/CN2021/143260 (Sep. 7, 2022).
European Patent Office, Search Report in European Patent Application No. 21946245.4 (Aug. 21, 2023).
Chinese Patent Office, Notification of grant of patent right for invention in Chinese Patent Application No. 202111656304.X (Apr. 14, 2025).
U.S. Patent and Trademark Office, Restriction Requirement in U.S. Appl. No. 18/092,044 (Apr. 15, 2025).
European Patent Office, Search Report in European Patent Application No. 22826786.0 (Sep. 13, 2023).
European Patent Office, Search Report in European Patent Application No. 22759005.6 (Aug. 21, 2023).
Patent Cooperation Treaty, International Search Report and Written Opinion, International Application No. PCT/CN2022/092861 (Jan. 12, 2023).
Patent Cooperation Treaty, International Search Report and Written Opinion, International Application No. PCT/CN2022/092859 (Feb. 9, 2023).
Patent Cooperation Treaty, International Search Report and Written Opinion, International Application No. PCT/CN2022/092862 (Feb. 9, 2023).
European Patent Office, Intention to grant in European Patent Application No. 21946245.4 (May 9, 2025).
Chinese Patent Office, Notification of grant of patent right for invention in Chinese Patent Application No. 202111656422.0 (Apr. 28, 2025).
Chinese Patent Office, Notification of grant of patent right for invention in Chinese Patent Application No. 202210524878.X (May 29, 2025).
Chinese Patent Office, Office Action in Chinese Patent Application No. 202211387650.7 (Jun. 14, 2025).
U.S. Patent and Trademark Office, Restriction Requirement in U.S. Appl. No. 18/092,044 (Jun. 12, 2025).
European Patent Office, Search Report in European Patent Application No. 21927724.1 (Nov. 16, 2023).
Patent Cooperation Treaty, International Search Report and Written Opinion, International Application No. PCT/CN2021/143267 (Sep. 8, 2022).
U.S. Patent and Trademark Office, Office Action in U.S. Appl. No. 18/092,044 (Aug. 25, 2025).
Ponce de Leon et al., "Optimization of capillary flow through open microchannel and open micropillar arrays." (Year: 2016).
Chinese Patent Office, Office Action in Chinese Patent Application No. 202111656422.0 (Jan. 15, 2025).
Chinese Patent Office, Office Action in Chinese Patent Application No. 202211045817.1 (Dec. 22, 2025).
Chinese Patent Office, Office Action in Chinese Patent Application No. 202111656286.5 (Dec. 24, 2025).
U.S. Patent and Trademark Office, Office Action in U.S. Appl. No. 18/092,044 (Jan. 9, 2026).

* cited by examiner

HEATING ASSEMBLY, VAPORIZER, AND ELECTRONIC VAPORIZATION DEVICE

CROSS-REFERENCE TO RELATED APPLICATION

This application is a continuation of International Application No. PCT/CN2022/092863, filed on May 13, 2022, which claims the benefit of priority to International Application No. PCT/CN2021/143259, filed on Dec. 30, 2021. The entire disclosures of these applications are incorporated by reference herein.

TECHNICAL FIELD

This application relates to the field of electronic vaporization technologies, and in particular, to a heating assembly, a vaporizer, and an electronic vaporization device.

BACKGROUND

An electronic vaporization device is formed by components such as a heating body, a battery, and a control circuit. The heating body is a core component of the electronic vaporization device, and characteristics thereof decide a vaporization effect and use experience of the electronic vaporization device.

One type of the existing heating body is a cotton core heating body. Most cotton core heating bodies are in a structure of a spring-shaped metal heating wire wrapped on a cotton rope or a fiber rope. A to-be-vaporized liquid aerosol-generation substrate is absorbed by two ends of the cotton rope or fiber rope and then transmitted to the centered metal heating wire for heating and vaporization. Because an area of an end portion of the cotton rope or the fiber rope is limited, the absorption efficiency and the transmission efficiency of the aerosol-generation substrate are relatively low. In addition, the structure stability of the cotton rope or the fiber rope is poor. As a result, phenomena such as dry burning, carbon accumulation, and a burnt flavor are likely to occur after a plurality of times of thermal cycling.

Another type of the existing heating body is a ceramic heating body. In most ceramic heating bodies, a metal heating film is formed on a surface of a porous ceramic body. The porous ceramic body plays a role of liquid guiding and liquid storage, and the metal heating film heats and vaporizes the liquid aerosol-generation substrate. However, it is hard for a porous ceramic manufactured through high-temperature sintering to accurately control position distribution and size precision of micropores. To reduce a risk of liquid leakage, a pore size and a porosity need to be decreased, but to implement sufficient liquid supplying, the pore size and the porosity need to be increased, which conflict with each other. At present, with the pore size and the porosity meeting a condition of a low liquid leakage risk, a liquid guiding capability of a porous ceramic substrate is limited, and a burnt flavor is generated under a high power condition.

As technologies advance, requirements of a user on the vaporization effect of the electronic vaporization device become increasingly high. To meet the requirements of the user, a thin heating body is provided to improve a liquid supplying capability. However, bubbles are easily formed on a liquid absorbing surface of the thin heating body, which blocks liquid intaking and leads to dry burning of the heating body.

SUMMARY

This application provides a heating assembly, a vaporizer, and an electronic vaporization device, to resolve the problem that bubbles are easily formed on a liquid absorbing surface in a thin heating body to cause dry burning in the related art.

To resolve the foregoing technical problem, a first technical solution provided in this application is to provide a heating assembly, including a first substrate and a second substrate, where the first substrate includes a first surface and a second surface arranged opposite to each other; the second substrate includes a third surface and a fourth surface arranged opposite to each other; the second surface and the third surface are arranged opposite to each other; the second substrate includes a plurality of second micropores; an edge of the first substrate is provided with a liquid inlet or cooperates with another component to form a liquid inlet; the second surface and the third surface are arranged opposite to each other to form a gap including a capillary effect, and the gap communicates the plurality of second micropores and the liquid inlet; the plurality of second micropores are configured to guide an aerosol-generation substrate from the gap to the fourth surface; and a height of the gap changes in gradient.

In an implementation, the first substrate includes a plurality of first micropores, and the plurality of first micropores are configured to guide the aerosol-generation substrate from the first surface to the second surface; and the gap communicates the plurality of first micropores and the plurality of second micropores.

In an implementation, the second substrate includes a vaporization region and a non-vaporization region;

- the heating assembly further include a heating component, the heating component is arranged on the fourth surface, and the heating component is arranged in the vaporization region; or
- at least a part of the vaporization region of the second substrate includes a conductive function to heat and vaporize the aerosol-generation substrate.

In an implementation, corresponding to the vaporization region, the height of the gap is less than 30 μm.

In an implementation, the height of the gap is less than 5 μm.

- in an implementation, the third surface is provided with a groove structure, and corresponding to the vaporization region, the height of the gap is less than 30 μm; or
- the third surface is a flat surface, and the height of the gap is less than 20 μm.

In an implementation, both the second surface and the third surface are flat surfaces; or

- one of the second surface and the third surface is a flat surface, and the other is a curved surface; or
- one of the second surface and the third surface is a flat surface, and the other is a step surface.

In an implementation, the edge of the first substrate is provided with two liquid inlets; directions parallel to the first substrate include a first direction and a second direction perpendicular to each other, and in the first direction, the height of the gap is gradually increased; and the two liquid inlets are respectively provided on two opposite sides of the first substrate in the first direction, or the two liquid inlets are respectively provided on two opposite sides of the first substrate in the second direction.

In an implementation, the heating assembly further includes a spacer; and the spacer is arranged between the second surface and the third surface and is arranged at the edge of the first substrate and/or an edge of the second substrate, so that the first substrate and the second substrate are arranged opposite to each other to form the gap.

In an implementation, the spacer is an independently arranged gasket; or the spacer is a support column, a support frame, or a coating fixed to the second surface and/or the third surface; or the spacer is a protrusion integrally formed with the first substrate and/or the second substrate.

In an implementation, the first substrate abuts against an edge of one end of the second substrate, and the spacer is arranged between the first substrate and an edge of the other end of the second substrate; or heights of spacers respectively arranged between the first substrate and edges of two ends of the second substrate are different.

In an implementation, the spacer includes a plurality of first sub-spacers and a plurality of second sub-spacers, and heights of the plurality of first sub-spacers and the plurality of second sub-spacers are different; the plurality of first sub-spacers are spaced and are arranged at an edge of one end of the first substrate and/or an edge of one end of the second substrate; and the plurality of second sub-spacers are spaced and are arranged at an edge of the other end of the first substrate and/or an edge of the other end of the second substrate.

In an implementation, the heating assembly further includes a fixing member, and the fixing member includes a liquid supplying hole; a fixing structure is arranged on a hole wall of the liquid supplying hole, to fix the first substrate and/or the second substrate, so that the first substrate and the second substrate form the gap; and at least a part of the edge of the first substrate and the hole wall of the liquid supplying hole are spaced to form the liquid inlet, and the second substrate crosses the entire liquid supplying hole.

In an implementation, capillary force of the plurality of second micropores is greater than capillary force of the plurality of first micropores.

In an implementation, the second substrate is a dense substrate, and the plurality of second micropores are straight through holes running through the third surface and the fourth surface.

In an implementation, the first substrate is a dense substrate, and the plurality of first micropores are straight through holes running through the first surface and the second surface.

In an implementation, a pore size of each of the plurality of first micropores ranges from 10 μm to 150 μm.

In an implementation, the edge of the first substrate is provided with a through hole; and the through hole serves as the liquid inlet.

In an implementation, both the first substrate and the second substrate are plate structures, and a thickness of the first substrate ranges from 0.1 mm to 1 mm; and a thickness of the second substrate ranges from 0.1 mm to 1 mm.

To resolve the foregoing technical problem, a second technical solution provided in this application is to provide a vaporizer, including a liquid storage cavity and a heating assembly, where the liquid storage cavity is configured to store an aerosol-generation substrate; the heating assembly is the heating assembly according to any one of the foregoing; and the liquid inlet of the heating assembly is in fluid communication with the liquid storage cavity, and the heating assembly is configured to vaporize the aerosol-generation substrate.

To resolve the foregoing technical problem, a third technical solution provided in this application is to provide an electronic vaporization device, including a vaporizer and a main unit, where the vaporizer is the vaporizer according to the foregoing; and the main unit is configured to supply electric energy for operation of the vaporizer and control the heating assembly to vaporize the aerosol-generation substrate.

This application provides a heating assembly, a vaporizer, and an electronic vaporization device. The heating assembly includes a first substrate and a second substrate; the first substrate includes a first surface and a second surface arranged opposite to each other, and the second substrate includes a third surface and a fourth surface arranged opposite to each other; the second surface and the third surface are arranged opposite to each other; the second substrate includes a plurality of second micropores; an edge of the first substrate is provided with a liquid inlet or cooperates with another component to form a liquid inlet, the second surface and the third surface are arranged opposite to each other to form a gap including a capillary effect, and the gap communicates the plurality of second micropores and the liquid inlet; the plurality of second micropores are configured to guide an aerosol-generation substrate from the gap to the fourth surface; and a height of the gap changes in gradient, so that capillary force formed by the gap changes in gradient, to drive fluid in the gap to flow, thereby helping discharge bubbles and preventing dry burning.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other accompanying drawings from these accompanying drawings without creative efforts.

DETAILED DESCRIPTION

The technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

In the following description, for the purpose of illustration rather than limitation, specific details such as the specific system structure, interface, and technology are proposed to thoroughly understand this application.

The terms "first", "second", and "third" in this application are merely intended for a purpose of description, and shall not be understood as indicating or implying relative significance or implicitly indicating the number of indicated technical features. Therefore, features defining "first", "second", and "third" can explicitly or implicitly include at least one of the features. In the description of this application, "a plurality of" means at least two, such as two and three unless it is specifically defined otherwise. All directional indications (for example, upper, lower, left, right, front, and rear) in the embodiments of this application are only used for explaining relative position relationships, movement situations, or the like between various components in a specific posture (as shown in the accompanying drawings). If the specific posture changes, the directional indications change accordingly. In the embodiments of this application, the terms "include", "have", and any variant thereof are intended to cover a non-exclusive inclusion. For example, a process, method, system, product, or device that includes a series of steps or units is not limited to the listed steps or units, but further optionally includes a step or unit that is not listed, or further optionally includes another step or component that is intrinsic to the process, method, product, or device.

"Embodiment" mentioned in this specification means that particular features, structures, or characteristics described with reference to the embodiment may be included in at least one embodiment of this application. The term appearing at different positions of this specification may not refer to the same embodiment or an independent or alternative embodiment that is mutually exclusive with another embodiment. A person skilled in the art explicitly or implicitly understands that the embodiments described in this specification may be combined with other embodiments.

This application is described in detail below with reference to the accompanying drawings and the embodiments.

Figure 1:
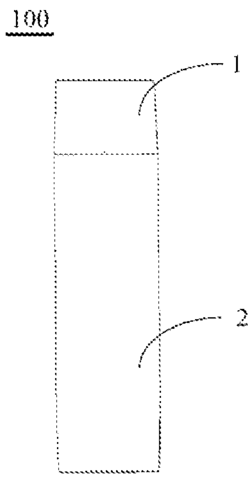
FIG. 1 is a schematic structural diagram of an embodiment of an electronic vaporization device according to this application.

Referring to FIG. 1, FIG. 1 is a schematic structural diagram of an embodiment of an electronic vaporization device according to this application.

In this embodiment, an electronic vaporization device 100 is provided. The electronic vaporization device 100 may be configured to vaporize an aerosol-generation substrate. The electronic vaporization device 100 includes a vaporizer 1 and a main unit 2 that are electrically connected to each other.

The vaporizer 1 is configured to store an aerosol-generation substrate and vaporize the aerosol-generation substrate to form aerosols that can be inhaled by a user. The vaporizer 1 specifically may be applied to different fields such as medical care, cosmetology, and recreation inhalation. In a specific embodiment, the vaporizer 1 may be applied to an electronic aerosol vaporization device to vaporize an aerosol-generation substrate and generate aerosols for inhalation by an inhaler, and the following embodiments are described by using the recreation inhalation as an example.

For a specific structure and functions of the vaporizer 1, reference may be made to the specific structure and functions of the vaporizer 1 involved in any one of the following embodiments, same or similar technical effects may also be implemented, and details are not described herein again.

The main unit 2 includes a battery (not shown in the figure) and a controller (not shown in the figure). The battery is configured to supply electric energy for operation of the vaporizer 1, to cause the vaporizer 1 to vaporize the aerosol-generation substrate to form aerosols. The controller is configured to control operation of the vaporizer 1. The main unit 2 further includes other components such as a battery holder and an airflow sensor.

The vaporizer 1 and the main unit 2 may be integrally arranged or may be detachably connected to each other, which may be designed according to a specific requirement.

Figure 2:
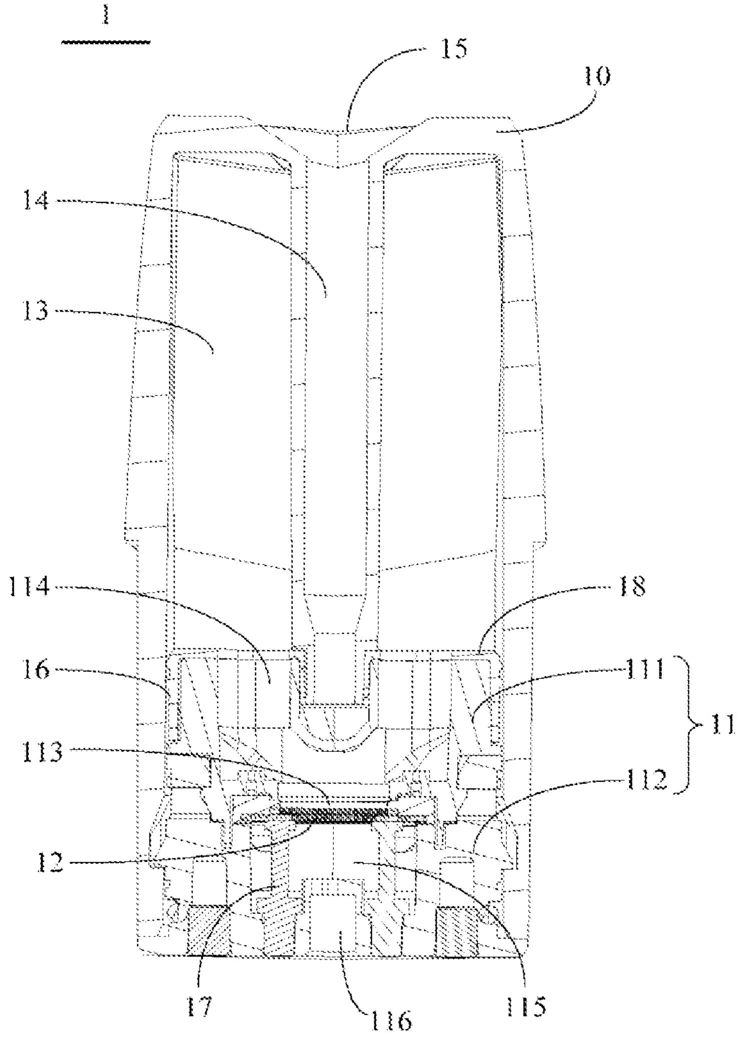
FIG. 2 is a schematic structural diagram of a vaporizer according to an embodiment of this application.

Referring to FIG. 2, FIG. 2 is a schematic structural diagram of a vaporizer according to an embodiment of this application.

The vaporizer 1 includes a housing 10, a vaporization base 11, and a heating assembly 12. The housing 10 includes a liquid storage cavity 13 and an air outlet channel 14, where the liquid storage cavity 13 is configured to store a liquid aerosol-generation substrate, and the liquid storage cavity 13 is provided surrounding the air outlet channel 14. An inhalation opening 15 is further provided on an end portion of the housing 10, and the inhalation opening 15 is in communication with the air outlet channel 14. Specifically, an end opening of the air outlet channel 14 may form the inhalation opening 15. A holding cavity 16 is provided on one side of the liquid storage cavity 13 that is away from the inhalation opening 15 of the housing 10, and the vaporization base 11 is arranged in the holding cavity 16. The vaporization base 11 includes a vaporization top base 111 and a vaporization bottom base 112. The vaporization top base 111 cooperates with the vaporization bottom base 112 to form an accommodating cavity 113. That is, the vaporization base 11 includes the accommodating cavity 113. The heating assembly 12 is arranged in the accommodating cavity 113 and is arranged together with the vaporization base 11 in the holding cavity 16.

Two fluid channels 114 are provided on the vaporization top base 111, and the two fluid channels 114 are provided on two sides of the air outlet channel 14. One end of each of the fluid channels 114 is in communication with the liquid storage cavity 13, and the other end is in communication with the accommodating cavity 113. That is, the fluid channels 114 communicate the liquid storage cavity 13 and the accommodating cavity 113, so that the aerosol-generation substrate in the liquid storage cavity 13 enters the heating assembly 12 through the fluid channels 114. That is, the heating assembly 12 is in fluid communication with the liquid storage cavity 13, and the heating assembly 12 is configured to absorb and heat and vaporize the aerosol-generation substrate. The controller of the main unit 2 controls the heating assembly 12 to vaporize the aerosol-generation substrate.

In this embodiment, a surface of the heating assembly 12 that is away from the liquid storage cavity 13 is a vaporization surface, a vaporization cavity 115 is formed between the vaporization surface of the heating assembly 12 and an inner wall surface of the accommodating cavity 113, and the vaporization cavity 115 is in communication with the air outlet channel 14. An air inlet 116 is provided on the vaporization bottom base 112, so that the vaporization cavity 115 is in communication with the outside. External air enters the vaporization cavity 115 through the air inlet 116, carries aerosols vaporized by the heating assembly 12 to enter the air outlet channel 14, and finally reaches the inhalation opening 15 to be inhaled by the user.

The vaporizer 1 further includes a conductor 17, and the conductor 17 is fixed to the vaporization bottom base 112. One end of the conductor 17 is electrically connected to the heating assembly 12, and the other end is electrically connected to the main unit 2, so that the heating assembly 12 can work.

The vaporizer 1 further includes a sealing top cap 18. The sealing top cap 18 is arranged on a surface of the vaporization top base 111 that is close to the liquid storage cavity 13 and configured to implement sealing between the liquid storage cavity 13 and the vaporization top base 111 and the air outlet channel 14, to prevent liquid leakage. Optionally, a material of the sealing top cap 18 is silicone or fluoro rubber.

Figure 3A:
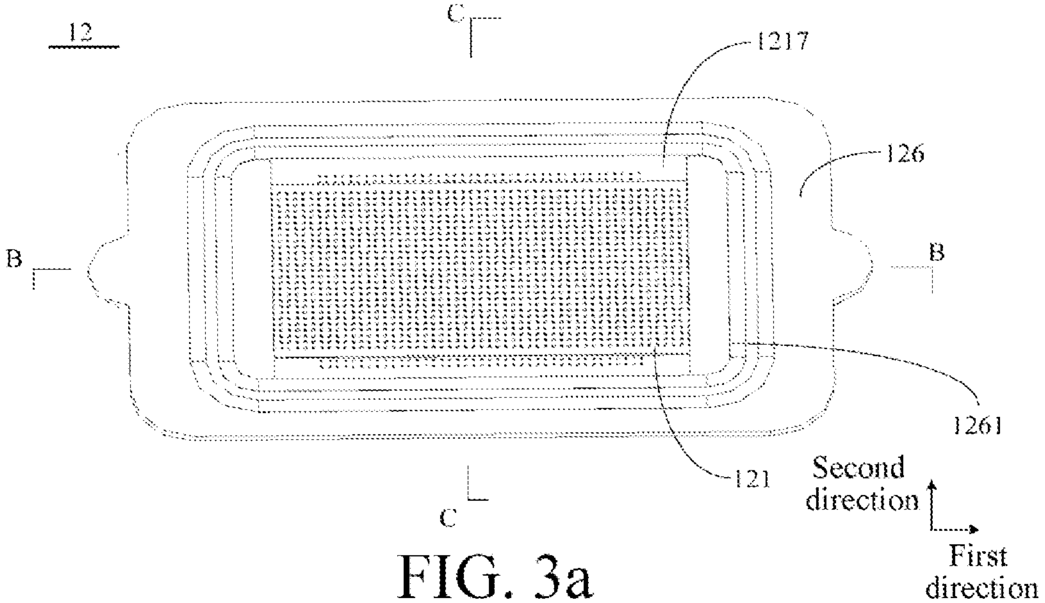
FIG. 3*a* is a schematic top structural view of a first embodiment of a heating assembly according to this application.
Figure 3B:
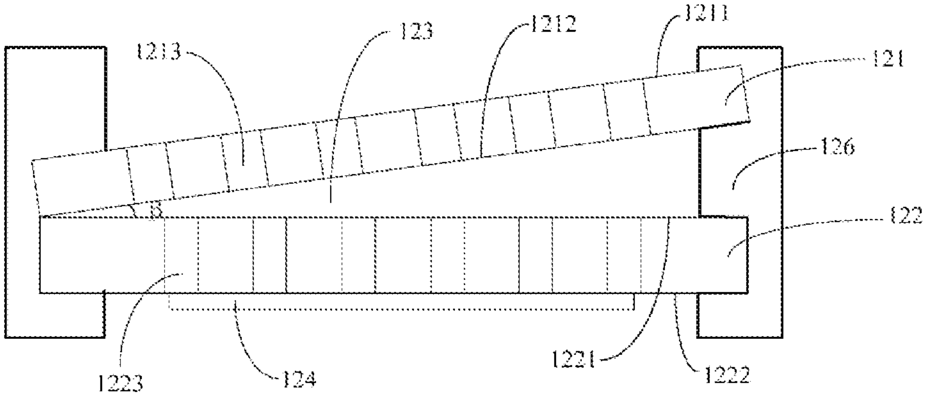
FIG. 3*b* is a schematic cross-sectional view of the heating assembly provided in FIG. 3*a* in a direction B-B.
Figure 3C:
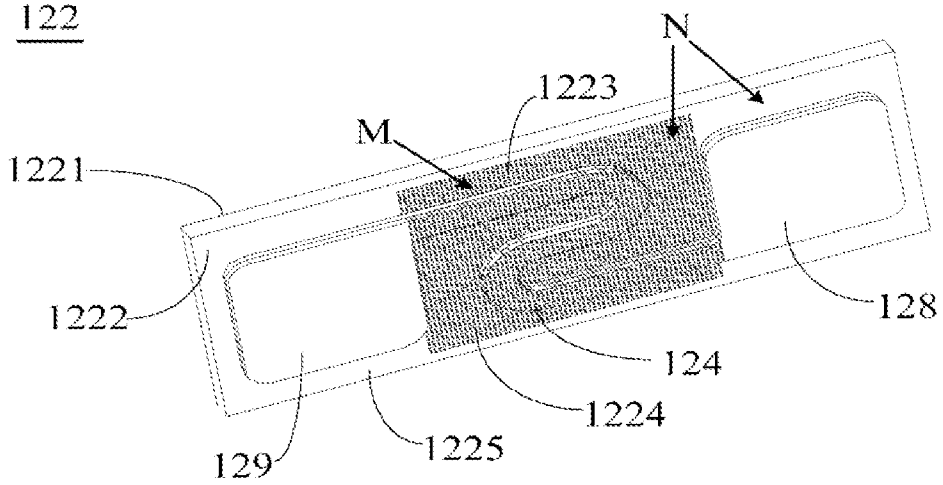
FIG. 3*c* is a schematic structural diagram of a second substrate in the heating assembly provided in FIG. 3*a* viewing from one side of a vaporization surface.
Figure 3D:
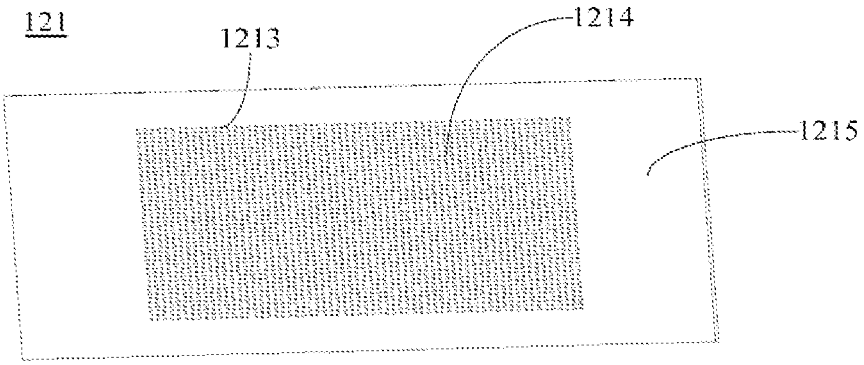
FIG. 3*d* is a schematic structural diagram of a first substrate in the heating assembly provided in FIG. 3*a* viewing from one side of a liquid absorbing surface.

Referring to FIG. 3*a*, FIG. 3*b*, FIG. 3*c*, and FIG. 3*d*, FIG. 3*a* is a schematic top structural view of a first embodiment of a heating assembly according to this application, FIG. 3*b* is a schematic cross-sectional view of the heating assembly provided in FIG. 3*a* in a direction B-B, FIG. 3*c* is a schematic structural diagram of a second substrate in the heating assembly provided in FIG. 3*a* viewing from one side of a vaporization surface, and FIG. 3*d* is a schematic structural diagram of a first substrate in the heating assembly provided in FIG. 3*a* viewing from one side of a liquid absorbing surface.

The heating assembly 12 includes a first substrate 121 and a second substrate 122.

The first substrate 121 includes a first surface 1211 and a second surface 1212 arranged opposite to each other, where the first surface 1211 is a liquid absorbing surface; and the first substrate 121 includes a plurality of first micropores 1213, and the plurality of first micropores 1213 are configured to guide an aerosol-generation substrate from the first surface 1211 to the second surface 1212. That is, the plurality of first micropores 1213 are configured to guide the aerosol-generation substrate from the liquid absorbing surface to the second surface 1212. An edge of the first substrate 121 is provided with a liquid inlet 1217, which may be disposed on the edge of the first substrate 121 or formed by the edge of the first substrate 121 with another component. The heating assembly 12 is in fluid communication with the liquid storage cavity 13 through the liquid inlet 1217. Both the first surface 1211 and the second surface 1212 are flat surfaces, and the first surface 1211 and the second surface 1212 are arranged parallel to each other.

The second substrate 122 includes a third surface 1221 and a fourth surface 1222 arranged opposite to each other, where the fourth surface 1222 is a vaporization surface; and the second substrate 122 includes a plurality of second micropores 1223, and the plurality of second micropores 1223 are configured to guide the aerosol-generation substrate from the third surface 1221 to the fourth surface 1222. That is, the plurality of second micropores 1223 are configured to guide the aerosol-generation substrate from the third surface 1221 to the vaporization surface. Both the third surface 1221 and the fourth surface 1222 are flat surfaces, and the third surface 1221 and the fourth surface 1222 are arranged parallel to each other.

The second surface 1212 and the third surface 1221 are arranged opposite to each other, and the second surface 1212 and the third surface 1221 are arranged opposite to each other to form a gap 123 including a capillary effect. The gap 123 communicates the plurality of first micropores 1213 and the plurality of second micropores 1223, and communicates the liquid inlet 1217 and the plurality of second micropores 1223. A height of the gap 123 changes in gradient, and capillary force also changes in gradient. Specifically, the height of the gap 123 is gradually increased, or the height of the gap 123 is first gradually decreased and then gradually increased.

In this embodiment, the second surface 1212 is obliquely arranged relative to the third surface 1221, an angle β is formed between the second surface 1212 and the third surface 1221, and the height of the gap 123 is gradually increased. Optionally, one end of the first substrate 121 is in contact with one end of the second substrate 122, and the other ends thereof are spaced (as shown in FIG. 3*b*). Optionally, two ends of the first substrate 121 and two ends of the second substrate 122 are both spaced, but distances spaced at the two ends are different.

A part of the aerosol-generation substrate enters the gap 123 from the liquid inlet 1217, a part of the aerosol-generation substrate enters the gap 123 through capillary force of the plurality of first micropores 1213 of the first substrate 121, and the aerosol-generation substrate in the gap 123 reaches the fourth surface 1222 of the second substrate 122 through capillary force of the plurality of second micropores 1223 of the second substrate 122 to generate aerosols through vaporization. That is, under the action of gravity and/or capillary force, the aerosol-generation substrate flows from the liquid absorbing surface (the first surface 1211) to the vaporization surface (the second surface 1222).

During vaporization of the heating assembly 12, in a process that the aerosol-generation substrate in the plurality of second micropores 1223 are consumed and waits to be supplemented, air may enter the gap 123 through the plurality of second micropores 1223 and form bubbles. If the bubbles grow up and block an end opening of each of the plurality of second micropores 1223 that is close to the first substrate 121, a problem of insufficient liquid supplying may occur, leading to dry burning. In the embodiments of this application, the height of the gap 123 is set to change in gradient, so that capillary force formed by the gap 123 also changes in gradient, so as to drive fluid in the gap 123 to flow, that is, drive the bubbles in the gap 123 to flow. Therefore, the bubbles in the gap 123 cannot be in a stable state and stuck, and the bubbles are pushed to be discharged from the plurality of first micropores 1213 and/or the liquid inlet 1217, so that the bubbles are prevented from staying in the gap 123 and blocking the end opening of each of the plurality of second micropores 1223 that is close to the first substrate 121, thereby ensuring sufficient liquid supplying and preventing dry burning.

When initial liquid injection of the liquid storage cavity 13 of the vaporizer 1 is completed or the aerosol-generation substrate in the gap 123 is consumed through reverse inhalation and is filled up again, the bubbles in the gap 123 need to be discharged when the aerosol-generation substrate in the liquid storage cavity 13 fills the gap 123 through the liquid inlet 1217 and/or the plurality of first micropores 1213. The inventor found through research that, because the viscosity of the aerosol-generation substrate in a non-heated state is relatively great and formed resistance is also great, the large bubbles in the gap 123 can be hardly discharged from the liquid inlet 1217 and are stuck at a middle position inside the gap 123, and the bubbles in the gap 123 can be also hardly discharged from the plurality of first micropores 1213, as a result, the plurality of second micropores 1223 are blocked. In the embodiments of this application, the height of the gap 123 is set to change in gradient, so that capillary force formed by the gap 123 also changes in gradient, so as to drive fluid in the gap 123 to flow, that is, drive the bubbles in the gap 123 to flow. Therefore, the bubbles are pushed to be discharged from the liquid inlet 1217, so that the bubbles are prevented from staying in the gap 123 and blocking the end opening of each of the plurality of second micropores 1223 that is close to the first substrate 121, thereby ensuring sufficient liquid supplying and preventing dry burning.

In addition, compared to a manner that the first substrate 121 and the second substrate 122 are arranged attached to each other, by forming the gap 123 between the first substrate 121 and the second substrate 122, transverse liquid supplement may be implemented. Even if the bubbles are attached to the first surface 1211 (the liquid absorbing surface) of the first substrate 121 and cover a part of the plurality of first micropores 1213, liquid supplying of the second substrate 122 may not be affected, thereby ensuring sufficient liquid supplying and preventing dry burning.

By arranging the first substrate 121 on one side of the second substrate 122 that is close to the liquid storage cavity 13, the bubbles may be prevented from growing up in a vertical direction, thereby helping discharge the bubbles and ensuring sufficient liquid supplying. In addition, the first substrate 121 may insulate heat to some extent and prevent heat on the second substrate 122 from being conducted to the liquid storage cavity 13, thereby helping ensure the taste consistency.

On the basis that the edge of the first substrate 121 is provided with the liquid inlet 1217 or cooperates with another component to form the liquid inlet 1217, the plurality of first micropores 1213 are further provided on the first substrate 121. Therefore, a liquid intaking amount is increased, and the aerosol-generation substrate is prevented from merely performing liquid intaking from the edge of the first substrate 121, that is, non-uniform liquid intaking of regions of the first substrate 121 is prevented. In addition, during vaporization, small bubbles entering from the plurality of second micropores 1223 may be removed from the plurality of first micropores 1213, so that the plurality of second micropores 1223 are prevented from being blocked.

In this embodiment, capillary force of each of the plurality of second micropores 1223 is greater than capillary force of each of the plurality of first micropores 1213, so that the aerosol-generation substrate can flow from the gap 123 to the fourth surface 1222 of the second substrate 122. Because each of the plurality of first micropores 1213 also includes capillary force, when the inhalation opening 15 is used downward, liquid reflux may be prevented, thereby preventing insufficient liquid supplying. That is, the gap 123 includes a specific liquid storage function, and it is proved through tests that the gap may not be burnt out for at least two times of reverse inhalation.

Referring to FIG. 3*c*, the second substrate 122 includes a vaporization region M and a non-vaporization region N. The vaporization region M is a region on which aerosols can be generated on the second substrate 122, the vaporization region M is arranged at a region covered by the heating component 124 and a surrounding region, and a shape of the vaporization region M is related to a shape of the heating component 124; and all regions other than the vaporization region M on the second substrate 122 are non-vaporization regions N. The heating assembly 12 further includes a heating component 124, a positive electrode 128, and a negative electrode 129, where two ends of the heating component 124 are respectively electrically connected to the positive electrode 128 and the negative electrode 129. The positive electrode 128 and the negative electrode 129 are both arranged on the fourth surface 1222 (the vaporization surface) of the second substrate 122 to be electrically connected to the main unit 2. The heating component 124 is arranged on the vaporization region M of the second substrate 122, and the heating component 124 may be arranged on the fourth surface 1222 (the vaporization surface) of the second substrate 122 or may be buried inside the second substrate 122, which is specifically designed as required. The heating component 124 may be a heating sheet, a heating film, or a heating mesh, provided that the aerosol-generation substrate can be heated and vaporized. In another implementation, at least a part of the vaporization region M of the second substrate 122 includes a conductive function and can generate heat to heat and vaporize the aerosol-generation substrate, such as conductive ceramic generating heat by itself or glass including a conductive function, and the heating component 124 does not need to be additionally arranged in this case. That is, the heating component 124 is an optional structure.

When the second substrate 122 does not include a conductive function and the heating component 124 is an additionally arranged component, a projection of the first substrate 121 on the second substrate 122 totally covers the heating component 124, to ensure that a liquid supplying speed can meet a vaporization speed of the heating component 124, thereby achieving a relatively good vaporization effect.

In this embodiment, corresponding to the vaporization region M, the height of the gap 123 is less than 20 μm. During vaporization, bubbles may enter only when the aerosol-generation substrate in the plurality of second micropores 1223 is consumed. The vaporization region M refers to a region on which aerosols can be generated through vaporization, the region has highest gasification efficiency and is a region where air mainly enters, that is, the bubbles mainly exist in a region corresponding to the vaporization region M. When the height of the gap 123 is greater than 20 μm, growing of the bubbles in the vertical direction cannot be well prevented, which is not conductive to discharge the bubbles and blocks liquid supplying. That is, the large bubbles may be prevented from reaching the liquid absorbing surface through the gap 123. Optionally, corresponding to the vaporization region M, the height of the gap 123 is less than 5 μm.

The first substrate 121 may be a porous substrate, for example, porous ceramic, cotton, quartz sand core, or a material of a foam structure. The first substrate 121 may also be a dense substrate, such as quartz, glass, or dense ceramic. When the material of the first substrate 121 is glass, the glass may be one of common glass, quartz glass, borosilicate glass, or photosensitive lithium aluminosilicate glass.

The second substrate 122 may be a porous substrate, for example, porous ceramic, cotton, quartz sand core, or a material of a foam structure. The second substrate 122 may also be a dense substrate, such as quartz, glass, or dense ceramic. When the material of the second substrate 122 is glass, the glass may be one of common glass, quartz glass, borosilicate glass, or photosensitive lithium aluminosilicate glass.

The material of the first substrate 121 and the material of the second substrate 122 may be the same or may be different. The first substrate 121 and the second substrate 122 may be randomly combined. For example, the first substrate 121 is porous substrate, and the second substrate 122 is a dense substrate. In another example, the first substrate 121 is a porous substrate, and the second substrate 122 is a porous substrate. In another example, the first substrate 121 is a dense substrate, and the second substrate 122 is a porous substrate. In another example, the first substrate 121 is a dense substrate, and the second substrate 122 is a dense substrate.

It may be understood that, when the first substrate 121 is a porous substrate, the plurality of first micropores 1213 are disordered through holes. When the second substrate 122 is a porous substrate, the plurality of second micropores 1223 are disordered through holes.

The following describes the heating assembly 12 in detail by using an example in which the first substrate 121 is a dense substrate and the second substrate 122 is a dense substrate.

When the first substrate 121 is a dense substrate, the plurality of first micropores 1213 are straight through holes running through the first surface 1211 and the second surface 1212. That is, the plurality of first micropores 1213 are ordered through holes. When the second substrate 122 is a dense substrate, the plurality of second micropores 1223 are straight through holes running through the third surface 1221 and the fourth surface 1222. That is, the plurality of second micropores 1223 are ordered through holes.

An extending direction of each of the plurality of first micropores 1213 may be parallel to a thickness direction of the first substrate 121 or may form an angle with the thickness direction of the first substrate 121, where the angle ranges from 80 degrees to 90 degrees. A cross section of each of the plurality of first micropores 1213 may be a circle, and a longitudinal section thereof may be a rectangle. An extending direction of each of the plurality of second micropores 1223 may be parallel to a thickness direction of the second substrate 122 or may form an angle with the thickness direction of the second substrate 122, where the angle ranges from 80 degrees to 90 degrees. A cross section of each of the plurality of second micropores 1223 may be a circle, and a longitudinal section thereof may be a rectangle. Shapes of the longitudinal sections and the extending directions of each of the plurality of first micropores 1213 and each of the plurality of second micropores 1223 may be designed as required. In this embodiment, each of the plurality of first micropores 1213 or each of the plurality of second micropores 1223 is a straight through hole parallel to the thickness direction of the first substrate 121 or the second substrate 122. That is, a central axis of each of the plurality of first micropores 1213 is perpendicular to the first surface 1211, and a central axis of each of the plurality of second micropores 1223 is perpendicular to the third surface 1221.

A projection of a region on the first substrate 121 where the plurality of first micropores 1213 are provided on the second substrate 122 totally covers a region on the second substrate 122 where the plurality of second micropores 1223 are provided, to ensure that a liquid supplying speed can meet a vaporization speed of the heating component 124 arranged on the fourth surface 1222 of the second substrate 122, thereby achieving a relatively good vaporization effect.

A pore size of each of the plurality of first micropores 1213 on the first substrate 121 ranges from 10 μm to 150 μm, which may provide a sufficient liquid supplying amount, and may be also used for discharging small bubbles and prevent the bubbles from growing up. When the pore size of each of the plurality of first micropores 1213 is less than 10 μm, the liquid supplying resistance is relatively great, and the liquid supplying requirement can be hardly met, leading to a decrease in an amount of generated aerosols or a risk of dry burning. When the pore size of each of the plurality of first micropores 1213 is greater than 150 μm, the bubbles cannot be prevented from growing up. In addition, when the pore size of each of the plurality of first micropores 1213 is excessively great, a liquid locking capability may be even lost, and the aerosol-generation substrate may easily leak out from the plurality of first micropores 1213 to cause liquid leakage, leading to a decrease in the vaporization efficiency Optionally, the pore size of each of the plurality of first micropores 1213 ranges from 30 μm to 100 μm. It may be understood that, the pore size of each of the plurality of first micropores 1213 is selected according to an actual requirement. Specifically, the pore size is selected according to the viscosity of the aerosol-generation substrate, and higher viscosity of the aerosol-generation substrate indicates a greater pore size selected within the range.

A pore size of each of the plurality of second micropores 1223 on the second substrate 122 ranges from 1 μm to 100 μm. When the pore size of each of the plurality of second micropores 1223 is less than 1 μm, the liquid supplying resistance is relatively great, and the liquid supplying requirement can be hardly met, leading to a decrease in an amount of generated aerosols or a risk of dry burning. When the pore size of each of the plurality of second micropores 1223 is greater than 100 μm, the aerosol-generation substrate may easily leak out from the plurality of second micropores 1223 to cause liquid leakage, leading to a decrease in the vaporization efficiency. Optionally, the pore size of each of the plurality of second micropores 1223 ranges from 20 μm to 50 μm. It may be understood that, the pore size of each of the plurality of second micropores 1223 is selected according to an actual requirement.

Optionally, the pore size of each of the plurality of first micropores 1213 is greater than the pore size of each of the plurality of second micropores 1223 (as shown in FIG. 3*b*), so that capillary force of each of the plurality of second micropores 1223 is greater than capillary force of each of the plurality of first micropores 1213.

A thickness of the second substrate 122 ranges from 0.1 mm to 1 mm. When the thickness of the second substrate 122 is greater than 1 mm, the liquid supplying requirement cannot be met, leading to a decrease in the amount of aerosols, a great heat loss, and high costs for providing the plurality of second micropores 1223; and when the thickness of the second substrate 122 is less than 0.1 mm, the intensity of the second substrate 122 cannot be ensured, which is not conducive to improve the performance of the electronic vaporization device. Optionally, the thickness of the second substrate 122 ranges from 0.2 mm to 0.5 mm. It may be understood that, the thickness of the second substrate 122 is selected according to an actual requirement. Because the thickness of the second substrate 122 falls within the foregoing range, that is, the thickness is relatively thin, during vaporization, the bubbles may easily enter the gap 123 from the plurality of second micropores 1223. By setting the height of the gap 123 to change in gradient, the capillary force formed by the gap 123 also changes in gradient, so as to drive the fluid in the gap 123 to flow, that is, drive the bubbles to be discharged from the liquid inlet 1217, so that the bubbles are prevented from staying in the gap 123 and blocking the end opening of each of the plurality of second micropores 1223 that is close to the first substrate 121, thereby ensuring sufficient liquid supplying.

A thickness of the first substrate 121 ranges from 0.1 mm to 1 mm. Optionally, the thickness of the first substrate 121 is less than the thickness of the second substrate 122. The thickness of the first substrate 121 is a distance between the first surface 1211 and the second surface 1212, and the thickness of the second substrate 122 is a distance between the third surface 1221 and the fourth surface 1222. It may be understood that, the bubbles in the gap 123 are discharged from the liquid inlet 1217 and/or the plurality of first micropores 1213, where large bubbles are discharged from the liquid inlet 1217, and small bubbles are discharged from the plurality of first micropores 1213. By setting the thickness of the first substrate 121 to fall within the foregoing range, a discharge path of the small bubbles is shortened, thereby helping discharge the small bubbles and further ensuring sufficient liquid supplying.

A ratio of the thickness of the second substrate 122 to the pore size of each of the plurality of second micropores 1223 ranges from 20:1 to 3:1, to improve a liquid supplying capability. When the ratio of the thickness of the second substrate 122 to the pore size of each of the plurality of second micropores 1223 is greater than 20:1, the aerosol-generation substrate supplied through the capillary force of each of the plurality of second micropores 1223 can hardly meet a vaporization required amount of the heating component 124, which easily leads to dry burning and a decrease in an amount of aerosols generated in single vaporization; and when the ratio of the thickness of the second substrate 122 to the pore size of each of the plurality of second micropores 1223 is less than 3:1, the aerosol-generation substrate may easily leak out from each of the plurality of second micropores 1223 to cause a waste, leading to a decrease in the vaporization efficiency and a decrease in a total amount of aerosols. Optionally, the ratio of the thickness of the second substrate 122 to the pore size of each of the plurality of second micropores 1223 ranges from 15:1 to 5:1.

A ratio of a distance between centers of two adjacent second micropores 1223 to the pore size of each of the plurality of second micropores 1223 ranges from 3:1 to 1.5:1, so that the intensity of the second substrate 122 is improved as much as possible while causing the plurality of second micropores 1223 on the second substrate 122 to meet the liquid supplying capability. Optionally, the ratio of the distance between centers of two adjacent second micropores 1223 to the pore size of each of the plurality of second micropores 1223 ranges from 3:1 to 2:1. Further optionally, the ratio of the distance between centers of two adjacent second micropores 1223 to the pore size of each of the plurality of second micropores 1223 ranges from 3:1 to 2.5:1.

Still referring to FIG. 3*c*, in this embodiment, the plurality of second micropores 1223 are merely provided on a part of the surface of the second substrate 122 in an array. Specifically, a microporous array region 1224 and a blank region 1225 provided surrounding a periphery of the microporous array region 1224 are provided on the second substrate 122, where the microporous array region 1224 includes the plurality of second micropores 1223; the heating component 124 is arranged in the microporous array region 1224 to heat and vaporize the aerosol-generation substrate; and the positive electrode 128 and the negative electrode 129 are arranged in the blank region 1225 on the fourth surface 1222 (the vaporization surface), to ensure the stability of the electrical connection between the positive electrode 128 and the negative electrode 129. It should be noted that, the heating component 124 is provided in the microporous array region 1224 and a region surrounding the heating component is the vaporization region M. That is, an area of the vaporization region M is less than an area of the microporous array region 1224.

By providing the microporous array region 1224 and the blank region 1225 provided surrounding the periphery of the microporous array region 1224 on the second substrate 122, it may be understood that, no second micropore 1223 is provided in the blank region 1225, and a number of second micropores 1223 on the second substrate 122 is reduced. Therefore, the intensity of the second substrate 122 is improved, and production costs for providing the second micropores 1223 on the second substrate 122 are reduced. The microporous array region 1224 in the second substrate 122 serves as the vaporization region M and covers the heating component 124 and a region around the heating component 124, that is, basically covers regions reaching a temperature for vaporizing the aerosol-generation substrate, so that the thermal efficiency is fully utilized.

It may be understood that, only when a size of a region around the microporous array region 1224 of the second substrate 122 in this application is greater than a pore size of each of the plurality of second micropores 1223, can the region be referred to as the blank region 1225. That is, the blank region 1225 in this application is a region in which second micropores 1223 can be formed but no second micropore 1223 is formed, rather than a region around the microporous array region 1224 and in which second micropores 1223 cannot be formed. In an embodiment, it is considered that a blank region 1225 is provided in a circumferential direction of the microporous array region 1224 only when a gap between a second micropore 1223 that is closest to a touchline of the second substrate 122 and the touchline of the second substrate 122 is greater than the pore size of each of the plurality of second micropores 1223.

The plurality of first micropores 1213 are provided in an entire surface, or the plurality of first micropores 1213 are provided in a part of the surface of the first substrate 121, which may be designed as required. Optionally, referring to FIG. 3*d*, a microporous array region 1214 and a blank region

1215 provided surrounding a periphery of the microporous array region 1214 are provided on the first substrate 121, where the microporous array region 1214 includes the plurality of first micropores 1213.

A shape of the first substrate 121 and a shape of the second substrate 122 may be a plate, a cylinder, or an arc, which are specifically designed as required; and the shape of the first substrate 121 and the shape of the second substrate 122 are set in a matching manner, provided that the gap 123 can be formed between the first substrate 121 and the second substrate 122. For example, the first substrate 121 and the second substrate 122 of the heating assembly 12 provided in FIG. 3*b* are both in a shape of a plate.

The first substrate 121 and the second substrate 122 may be set to he in a regular shape, such as a rectangular plate or a circular plate. The plurality of first micropores 1213 provided on the first substrate 121 are arranged in an array. That is, the plurality of first micropores 1213 provided on the first substrate 121 are regularly arranged, and distances between centers of adjacent first micropores 1213 among the plurality of first micropores 1213 are the same. The plurality of second micropores 1223 provided on the second substrate 122 are arranged in an array. That is, the plurality of second micropores 1223 provided on the second substrate 122 are regularly arranged, and distances between centers of adjacent second micropores 1223 among the plurality of second micropores 1223 are the same.

Still referring to FIG. 3*a* and FIG. 3*b*, the heating assembly 12 further includes a fixing member 126, the fixing member 126 includes a liquid supplying hole 1261, and the liquid supplying hole 1261 is in fluid communication with the liquid storage cavity 13 through a fluid channel 114. A fixing structure (not marked in the figure) is arranged on the hole wall of the liquid supplying hole 1261, to fix the first substrate 121 and/or the second substrate 122 and cause the first substrate 121 and the second substrate 122 to be arranged opposite to each other to form the gap 123. When the fixing member 126 covers the periphery of the second substrate 122, the fixing member 126 does not block the heating component 124, and the liquid supplying hole 1261 can totally expose the heating component 124. A specific arrangement manner of the fixing structure is designed as required, provided that the first substrate 121 and the second substrate 122 can be fixed and the gap 123 can be formed between the first substrate 121 and the second substrate 122.

Optionally, both the first substrate 121 and the second substrate 122 are arranged in the liquid supplying hole 1261 (as shown in FIG. 3*b*).

Optionally, a material of the fixing member 126 is silicone or fluoro rubber, so that sealing is implemented while the first substrate 121 and/or the second substrate 122 are fixed.

Figure 4:
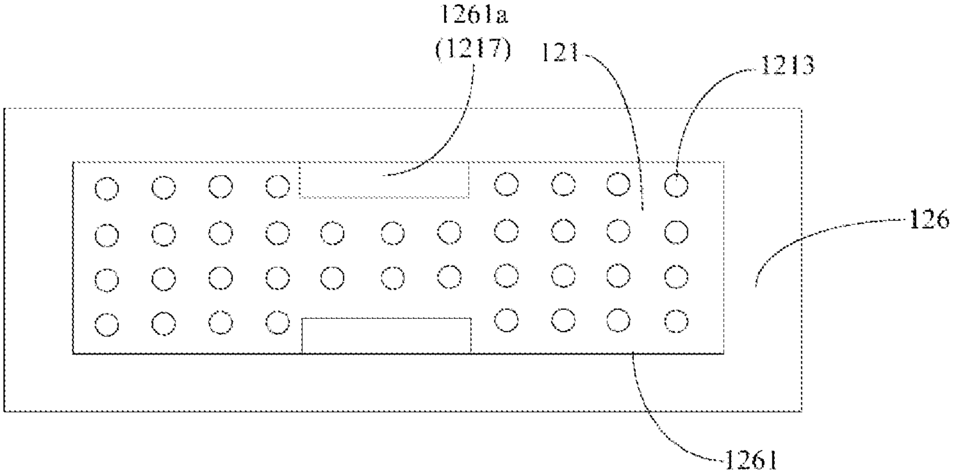
FIG. 4 is a schematic structural diagram of another implementation of a liquid inlet of the heating assembly provided in FIG. 3*a;*
Figure 5:
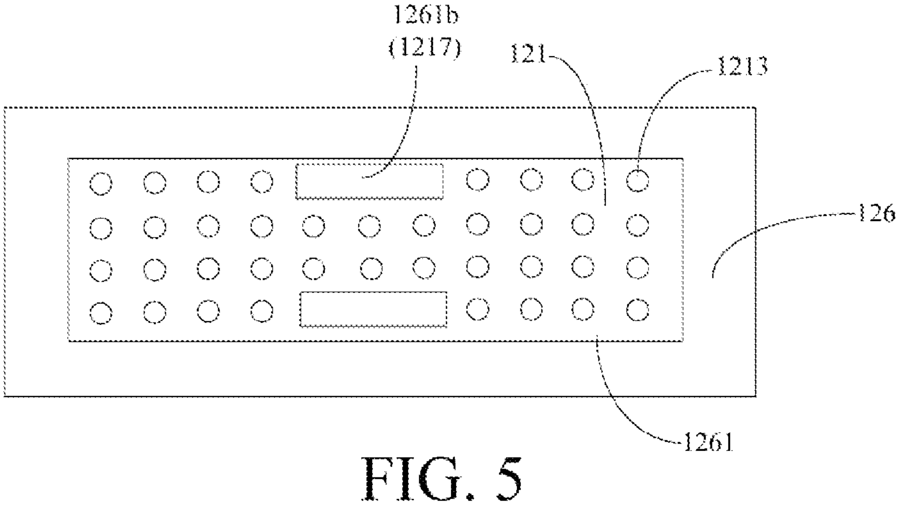
FIG. 5 is a schematic structural diagram of still another implementation of a liquid inlet of the heating assembly provided in FIG. 3*a;*

In this embodiment, at least a part of the edge of the first substrate 121 and the hole wall of the liquid supplying hole 1261 are spaced to form the liquid inlet 1217, and the second substrate 122 crosses the entire liquid supplying hole 1261. For example, two opposite sides of the first substrate 121 in a direction B-B are respectively spaced from the hole wall of the liquid supplying hole 1261 to form two symmetrically provided liquid inlets 1217 (as shown in FIG. 3*a*). For example, each of the two opposite sides of the first substrate 121 in the direction B-B is provided with a notch 1261*a*, namely, the two opposite sides in the direction B-B and the hole wall of the liquid supplying hole 1261 are respectively spaced to form the two liquid inlets 1217 (as shown in FIG. 4, and FIG. 4 is a schematic structural diagram of another implementation of a liquid inlet of the heating assembly provided in FIG. 3*a*). In another example, the edge of the first substrate 121 is provided with a through hole 1261*b* to serve as the liquid inlet 1217; and A size, a shape, and a number of the through holes 1261*b* are designed as required (as shown in FIG. 5, FIG. 5 is a schematic structural diagram of still another implementation of a liquid inlet of the heating assembly provided in FIG. 3*a*).

Still referring to FIG. 3*a* and FIG. 3*b*, the edge of first substrate 121 is provided with two liquid inlets 1217. Directions parallel to the first substrate 121 include a first direction (a direction shown by a line B-B) and a second direction (a direction shown by a line C-C) perpendicular to each other. In the first direction, the height of the gap 123 is gradually increased, and the two liquid inlets 1217 are respectively provided on two opposite sides of the first substrate 121 in the first direction. The first substrate 121 is a rectangular base plate, and the direction shown by the line B-B is a length direction of the first substrate 121, namely, the first direction is the length direction of the first substrate 121; and the direction shown by the line C-C is a width direction of the first substrate 121, namely, the second direction is the width direction of the first substrate 121.

Figure 6:
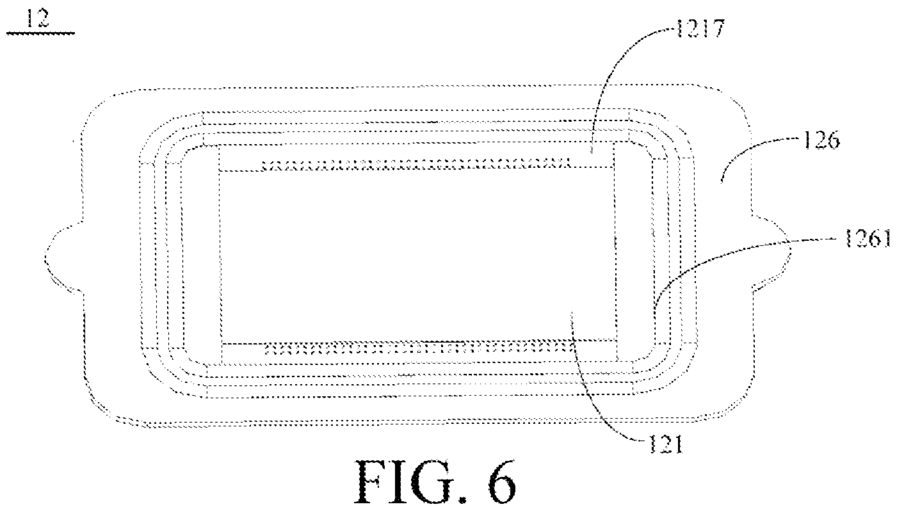
FIG. 6 is a schematic top structural view of a second embodiment of a heating assembly according to this application.

Referring to FIG. 6, FIG. 6 is a schematic top structural view of a second embodiment of a heating assembly according to this application.

A difference between the second embodiment of the heating assembly 12 and the first embodiment of the heating assembly 12 lies in that: in the first embodiment of the heating assembly 12, the first substrate 121 includes a plurality of first micropores 1213, but in the second embodiment of the heating assembly 12, no first micropore 1213 is provided on the first substrate 121, and arrangement manners of other structures in the second embodiment of the heating assembly 12 are all the same as those in the first embodiment of the heating assembly 12, which are not described herein again.

In this embodiment, the first substrate 121 is a dense substrate, and no first micropore 1213 is provided on the first substrate 121. Liquid supplement is performed through the liquid inlet 1217, and bubbles are removed through the liquid inlet 1217, thereby avoiding the impact of the bubbles entering the liquid storage cavity 13 on liquid supplying and further preventing dry burning. It may be understood that, by not providing the first micropore 1213 on the first substrate 121, process procedures may be reduced, thereby helping ensure the intensity of the first substrate 121.

Figure 7:
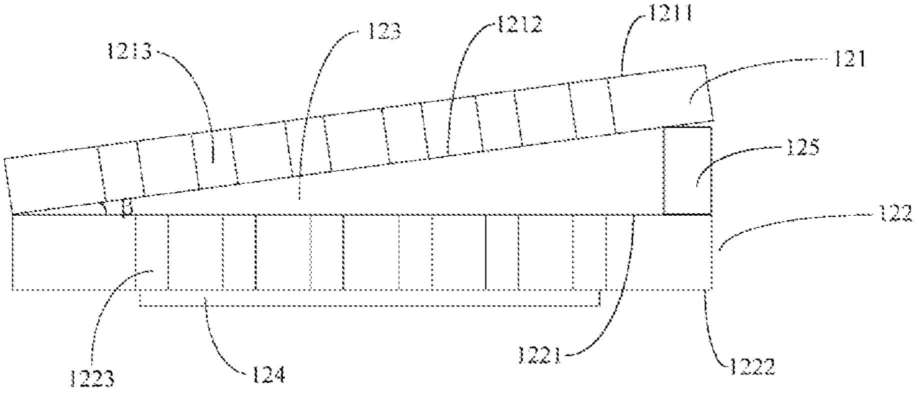
FIG. 7 is a schematic cross-sectional view of a third embodiment of a heating assembly according to this application.

Referring to FIG. 7, FIG. 7 is a schematic cross-sectional view of a third embodiment of a heating assembly according to this application.

A difference between the third embodiment of the heating assembly 12 and the first embodiment of the heating assembly 12 lies in that: in the first embodiment of the heating assembly 12, the gap 123 is formed between the first substrate 121 and the second substrate 122 through the fixing member 126, but in the third embodiment of the heating assembly 12, the gap 123 is formed between the first substrate 121 and the second substrate 122 through a spacer 125; and arrangement manners of other structures in the third embodiment of the heating assembly 12 are all the same as those in the first embodiment of the heating assembly 12, which are not described herein again.

In this embodiment, the heating assembly 12 further includes a spacer 125. The spacer 125 is arranged between the second surface 1212 of the first substrate 121 and the third surface 1221 of the second substrate 122 and is arranged at an edge of the first substrate 121 and/or an edge of the second substrate 122, so that the first substrate 121 and the second substrate 122 are arranged opposite to each other to form the gap 123.

Optionally, the first substrate 121 abuts against an edge of one end of the second substrate 122, and the spacer 125 is arranged between the first substrate 121 and an edge of the other end of the second substrate 122 (as shown in FIG. 7).

Optionally, only one spacer 125 is arranged between the first substrate 121 and/or one end of the second substrate 122. In this case, a length of the spacer 125 is the same as a width of the first substrate 121 and/or a width of the second substrate 122. The fixing structure of the fixing member 126 is only configured to fix the first substrate 121 and/or the second substrate 122; and by setting the material of the fixing member 126 to be silicone including a sealing function, the first substrate 121 and the second substrate 122 are sealed.

Figure 8:
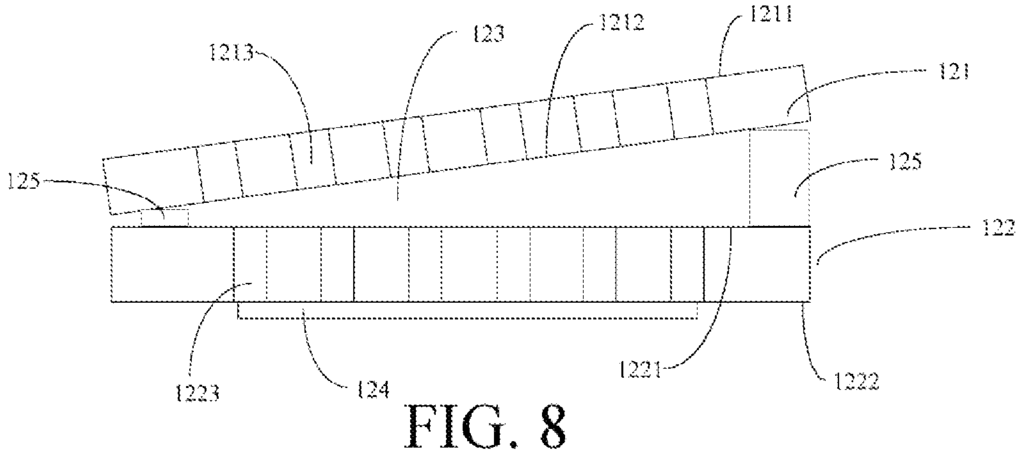
FIG. 8 is a schematic structural diagram of another implementation of a spacer in the heating assembly provided in FIG. 7.

Optionally, the height of the gap 123 is gradually increased in the first direction (the length direction of the first substrate 121). Two spacers 125 may be arranged between the second surface 1212 and the third surface 1221, the two spacers 125 are respectively arranged at edges of two opposite ends of the first substrate 121 and the second substrate 122, and heights of the two spacers 125 are different (as shown in FIG. 8, FIG. 8 is a schematic structural diagram of another implementation of a spacer in the heating assembly provided in FIG. 7). The two spacers 125 are strip-shaped and are spaced on the edges of the two opposite ends of the first substrate 121 and the second substrate 122 in parallel in the first direction; and a length direction of the spacer 125 is parallel to the second direction (the width direction of the first substrate 121) perpendicular to the first direction (the length direction of the first substrate 121). Because the heights of the two spacers 125 are different, in a direction from one spacer 125 to the other spacer 125, namely, in the first direction, the height of the gap 123 is gradually increased.

Optionally, two spacers 125 may be arranged between the second surface 1212 and the third surface 1221, and the two spacers 125 are respectively arranged at edges of two opposite ends of the first substrate 121 and the second substrate 122. The height of the gap 123 is gradually increased in the first direction (the length direction of the first substrate 121). The two spacers 125 are strip-shaped and are spaced on the edges of the two opposite ends of the first substrate 121 and the second substrate 122 in parallel in the second direction (the width direction of the first substrate 121) perpendicular to the first direction (the length direction of the first substrate 121), namely, a width direction of the two spacers 125 is parallel to the first direction; and heights of the two spacers 125 are gradually increased in the first direction, so that the height of the gap 123 is gradually increased in the first direction.

Optionally, the height of the gap 123 is gradually increased in the first direction (the length direction of the first substrate 121). The spacer 125 includes a plurality of first sub-spacers (not shown in the figure) and a plurality of second sub-spacers (not shown in the figure), and heights of the plurality of first sub-spacers and the plurality of second sub-spacers are different; the plurality of first sub-spacers are spaced and are arranged at an edge of one end of the first substrate 121 and/or an edge of one end of the second substrate 122, and the plurality of first sub-spacers are arranged in the second direction (the width direction of the first substrate 121); and the plurality of second sub-spacers are spaced and are arranged at an edge of the other end of the first substrate 121 and/or an edge of the other end of the second substrate 122, and the plurality of second sub-spacers are arranged in the second direction (the width direction of the first substrate 121). The fixing structure of the fixing member 126 is only configured to fix the first substrate 121 and/or the second substrate 122; and by setting the material of the fixing member 126 to be silicone including a sealing function, the first substrate 121 and the second substrate 122 are sealed.

Optionally, the height of the gap 123 is gradually increased in the first direction (the length direction of the first substrate 121). Two rows of spacers 125 are spaced on the edges of the two opposite ends of the first substrate 121 and the second substrate 122 in parallel in the second direction (the width direction of the first substrate 121); and each row of spacers 125 is arranged in the first direction. heights of each row of spacers 125 that are spaced are gradually increased in the first direction, so that the height of the gap 123 is gradually increased in the first direction.

Optionally, the spacer 125 is an independently arranged gasket, and the gasket is detachably connected to the first substrate 121 and the second substrate 122. Specific operations are as follows: the plurality of first micropores 1213 are formed on the first substrate 121, the plurality of second micropores 1223 are formed on the second substrate 122, and the gasket is then arranged between the first substrate 121 and the second substrate 122. Specifically, the gasket is arranged between the blank region 1215 on the first substrate 121 and the blank region 1225 on the second substrate 122. For example, the spacer 125 may be a silicone frame or a plastic frame.

Optionally, the spacer 125 is a support column, a support frame, or a coating fixed to the second surface 1212 of the first substrate 121 and/or the third surface 1221 of the second substrate 122, the support column or the support frame is fixed to the second surface 1212 of the first substrate 121 and/or the third surface 1221 of the second substrate 122 in a clamping or soldering manner, and the coating is formed on the second surface 1212 of the first substrate 121 and/or the third surface 1221 of the second substrate 122 in a electroplating, evaporation, or deposition manner. Specific operations are as follows: the plurality of first micropores 1213 are formed on the first substrate 121, the plurality of second micropores 1223 are formed on the second substrate 122, and the support column, the support frame, or the coating is then integrated with the first substrate 121 and the second substrate 122 in a soldering, clamping, or electroplating manner. For example, the first substrate 121 and the second substrate 122 are glass plates, glass powder is coated on an edge of the first substrate 121, and after the second substrate 122 is covered on the first substrate, the glass powder is sintered through laser into glass to fix the support column or the support frame to the first substrate 121 and the second substrate 122.

Optionally, the spacer 125 is a protrusion integrally formed with the first substrate 121 and/or the second substrate 122. If the spacer 125 is a protrusion integrally formed with the first substrate 121, the plurality of first micropores 1213 are formed on the first substrate 121, the plurality of second micropores 1223 are formed on the second substrate 122, and the second substrate 122 is then overlapped on the protrusion to form the gap 123. If the spacer 125 is a protrusion integrally formed with the second substrate 122, the plurality of first micropores 1213 are formed on the first substrate 121, the plurality of second micropores 1223 are formed on the second substrate 122, and the first substrate 121 is then overlapped on the protrusion to form the gap 123. For example, etching is performed on the second surface 1212 of the first substrate 121 to form a groove, a side wall of the groove serves as the spacer 125, and the plurality of first micropores 1213 are formed on a bottom wall of the groove. The third surface 1221 of the second substrate 122 is a plane, the third surface 1221 of the second substrate 122 is overlapped on an end surface of the side wall of the groove on the second surface 1212, that is, the third surface 1221 of the second substrate 122 is attached to the second surface 1212 of the first substrate 121, and the third surface 1221 cooperates with the groove to form the gap 123. If a bottom surface of the groove is explained as the second surface 1212, the side wall of the groove may be explained as a protrusion on the second surface 1212.

Figure 9A:
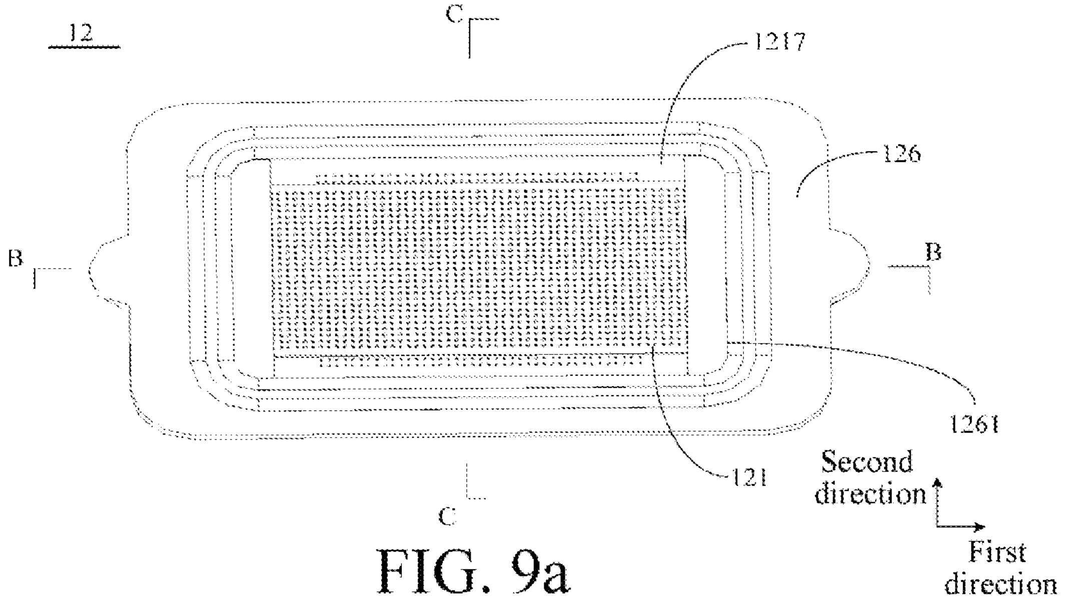
FIG. 9*a* is a schematic top structural view of a fourth embodiment of a heating assembly according to this application.
Figure 9B:
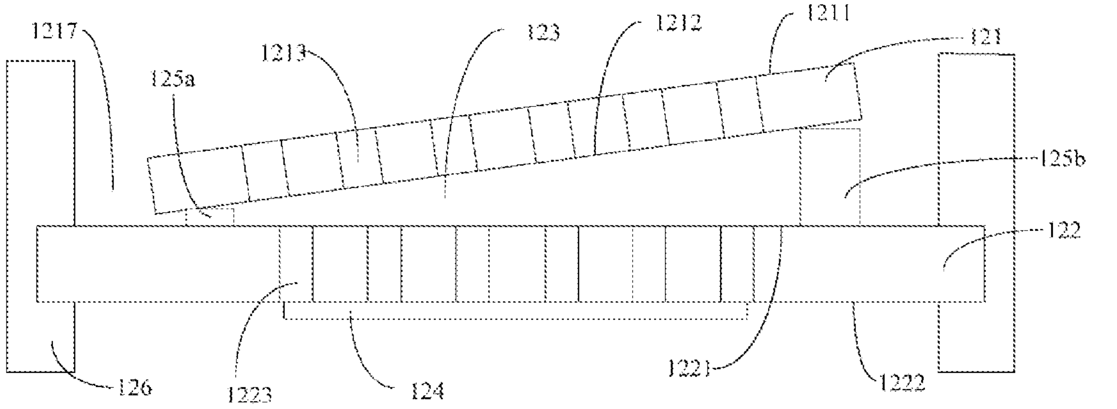
FIG. 9*b* is a schematic cross-sectional view of the heating assembly provided in FIG. 9*a* in a direction C-C.

Referring to FIG. 9*a* and FIG. 9*b*, FIG. 9*a* is a schematic top structural view of a fourth embodiment of a heating assembly according to this application, and FIG. 9*b* is a schematic cross-sectional view of the heating assembly provided in FIG. 9*a* in a direction C-C.

A difference between the fourth embodiment of the heating assembly 12 and the first embodiment of the heating assembly 12 lies in that: in the first embodiment of the heating assembly 12, the height of the gap 123 is gradually increased in the first direction (the direction shown by the line B-B), but in the fourth embodiment of the heating assembly 12, the height of the gap 123 is gradually increased in the second direction (the direction shown by the line C-C); and arrangement manners of other structures in the fourth embodiment of the heating assembly 12 are all the same as those in the first embodiment of the heating assembly 12, which are not described herein again.

In this embodiment, the first substrate 121 includes two liquid inlets 1217 or cooperates with other components to form two liquid inlets 1217, and the two liquid inlets 1217 are respectively provided on two opposite sides of the first substrate 121 in the first direction (the direction shown by the line B-B).

In a specific implementation, the first substrate 121 and the second substrate 122 form the gap 123 through the spacer 125, and for the spacer 125, reference may be made to the content introduced above. The fixing member 126 is only configured to fix the first substrate 121 and the second substrate 122.

Optionally, the first substrate 121 abuts against an edge of one end of the second substrate 122, and a plurality of spacers 125 are arranged between the first substrate 121 and an edge of the other end of the second substrate 122, where the plurality of spacers 125 are spaced. A groove (not shown in the figure) is provided on the first substrate 121 and/or the second substrate 122 on one end of the first substrate 121 abutting against the second substrate 122, and the groove causes one of the two liquid inlets 1217 to be in communication with the gap 123; and the plurality of spacers 125 are arranged between the first substrate 121 and the other end of the second substrate 122, and the plurality of spacers 125 are spaced, so that the other one of the two liquid inlets 1217 is in communication with the gap 123 through a flow channel between two adjacent spacers 125.

Optionally, the spacer 125 includes a plurality of first sub-spacers 125*a* and a plurality of second sub-spacers 125*b*, and heights of the plurality of first sub-spacers 125*a* and the plurality of second sub-spacers 125*b* are different; the plurality of first sub-spacers 125*a* are spaced and are arranged at an edge of one end of the first substrate 121 and/or an edge of one end of the second substrate 122; and the plurality of second sub-spacers 125*b* are spaced and are arranged at an edge of the other end of the first substrate 121 and/or an edge of the other end of the second substrate 122. One of the two liquid inlets 1217 is in communication with the gap 123 through a flow channel between two adjacent first sub-spacers 125*a*, and the other end of the two liquid inlets 1217 is in communication with the gap 123 through a flow channel between two adjacent second sub-spacers 125*b* (as shown in FIG. 9*a* and FIG. 9*b*).

It may be understood that, the heating assembly 12 provided in FIG. 9*a* may also define specific arrangement of the liquid inlet 1217 as that the two liquid inlets 1217 are respectively provided on two opposite sides of the first substrate 121 in the second direction (the direction shown by the line B-B), and the height of the gap 123 is gradually increased in the first direction (the direction shown by the line C-C). Different definitions of the first direction and the second direction may correspond to different explanations.

Figure 10:
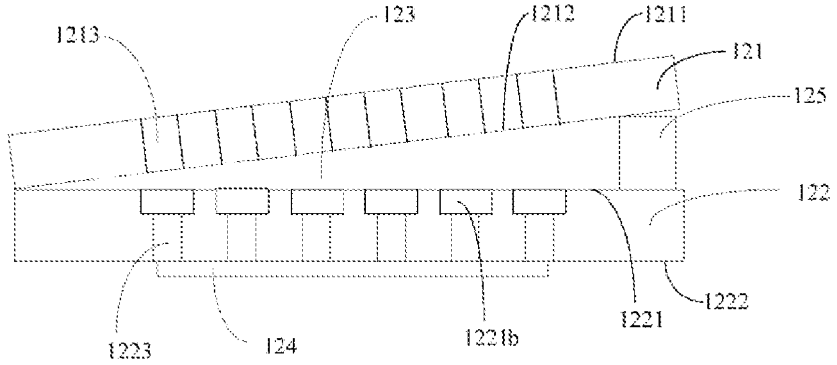
FIG. 10 is a schematic cross-sectional view of a fifth embodiment of a heating assembly according to this application.

Referring to FIG. 10, FIG. 10 is a schematic cross-sectional view of a fifth embodiment of a heating assembly according to this application.

A difference between the fifth embodiment of the heating assembly 12 and the first embodiment of the heating assembly 12 lies in that: in the fifth embodiment of the heating assembly 12, a groove structure is provided on the third surface 1221 of the second substrate 122, but the third surface 1221 of the second substrate 122 in the first embodiment of the heating assembly 12 is a flat surface; and arrangement manners of other structures in the fifth embodiment of the heating assembly 12 are all the same as those in the first embodiment of the heating assembly 12, which are not described herein again.

In this embodiment, corresponding to the vaporization region M, the height of the gap 123 is less than 30 μm. Compared with the case that the third surface 1221 of the second substrate 122 is a flat surface, a groove structure is provided on the third surface 1221 of the second substrate 122, air may enter the groove structure through the plurality of second micropores 1223 during inhalation. Due to factors such as surface tension, bubbles are more likely to enter the gap 123 to be discharged to the liquid storage cavity 13 through the liquid inlet 1217 or the plurality of first micropores 1213, so that the groove structure is unlocked, thereby ensuring sufficient liquid supplying and preventing dry burning. Therefore, the height of the gap 123 includes a relatively great range. When the height of the gap 123 is greater than 30 μm, growing of the bubbles in the vertical direction cannot be well prevented, which is not conductive to discharge the bubbles and blocks liquid supplying. Optionally, corresponding to the vaporization region M, the height of the gap 123 is less than 5 μm.

In addition, by providing the groove structure on the third surface 1221 of the second substrate 122, a liquid storage amount of the gap 123 may be increased.

Figure 11:
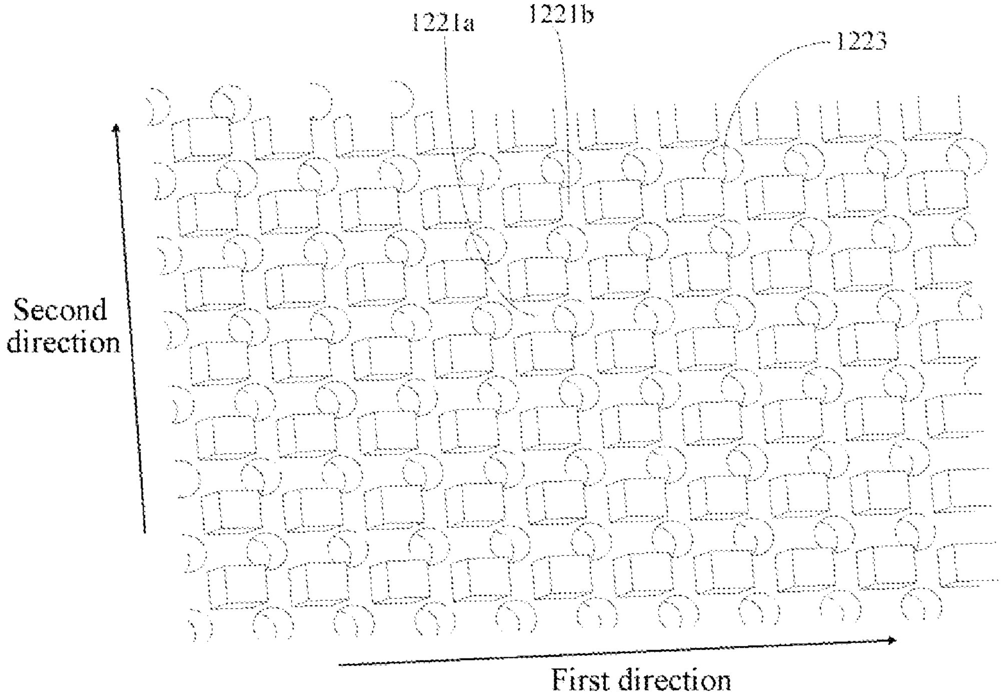
FIG. 11 is a schematic partial enlarged structural view of a third surface of a second substrate in the heating assembly provided in FIG. 10.

In an implementation, a plurality of first grooves 1221*a* extending in the first direction (the direction shown by the line B-B) and a plurality of second grooves 1221*b* extending in the second direction (the direction shown by the line C-C) are provided on the third surface 1221 of the second substrate 122, and the plurality of first grooves 1221*a* and the plurality of second grooves 1221*b* are provided in an intersecting manner. The plurality of first grooves 1221*a* and the plurality of second grooves 1221*b* form the groove structure (as shown in FIG. 11, FIG. 11 is a schematic partial enlarged structural view of a third surface of a second substrate in the heating assembly provided in FIG. 10).

The plurality of first grooves 1221*a* and the plurality of second grooves 1221*b* include capillary force, and the aerosol-generation substrate may be guided in a transverse direction, so that the aerosol-generation substrate enters the plurality of second micropores 1223 uniformly, thereby playing a role of transverse liquid supplement and further preventing dry burning. The transverse direction refers to a direction not parallel to the extending direction of each of the plurality of second micropores 1223, such as a direction perpendicular to the central axis of each of the plurality of second micropores 1223.

Because the plurality of first grooves 1221*a* and the plurality of second grooves 1221*b* include capillary force, so that transverse liquid supplement can be performed, and air-liquid separation may be ensured through the gap 123, thereby reducing the impact of the bubbles on liquid supplying. In addition, by providing the plurality of first grooves 1221*a* and the plurality of second grooves 1221*b* intersecting with each other on the third surface 1221, the aerosol-generation substrate in the gap 123 can be guided to the plurality of second micropores 1223, thereby facilitating liquid supplying.

The plurality of second micropores 1223 are distributed in an array, each of the plurality of first grooves 1221*a* corresponds to one row or a plurality of rows of second micropores 1223, and each of the plurality of second grooves 1221*b* corresponds to one column or a plurality of columns of second micropores 1223, which are specifically designed as required. For example, each of the plurality of first grooves 1221*a* corresponds to one row of second micropores 1223 and each of the plurality of second grooves 1221*b* corresponds to one column of second micropores 1223 (as shown in FIG. 11).

A ratio of a depth to a width of each of the plurality of first grooves 1221*a* ranges from 0 to 20. When the ratio of the depth to the width of each of the plurality of first grooves 1221*a* is greater than 20, the capillary force included by the plurality of first grooves 1221*a* cannot achieve a relatively good transverse liquid supplement effect. Optionally, the ratio of the depth to the width of each of the plurality of first grooves 1221*a* ranges from 1 to 5.

A ratio of a depth to a width of each of the plurality of second grooves 1221*b* ranges from 0 to 20. When the ratio of the depth to the width of each of the plurality of second grooves 1221*b* is greater than 20, the capillary force included by the plurality of second grooves 1221*b* cannot achieve a relatively good transverse liquid supplement effect. Optionally, the ratio of the depth to the width of each of the plurality of second grooves 1221*b* ranges from 1 to 5.

In another implementation, only the plurality of first grooves 1221*a* extending in the first direction (the direction shown by the line B-B) or only the plurality of second grooves 1221*b* extending in the second direction (the direction shown by the line C-C) are provided, that is, adjacent second micropores 1223 are only communicated in one direction.

Figure 12:
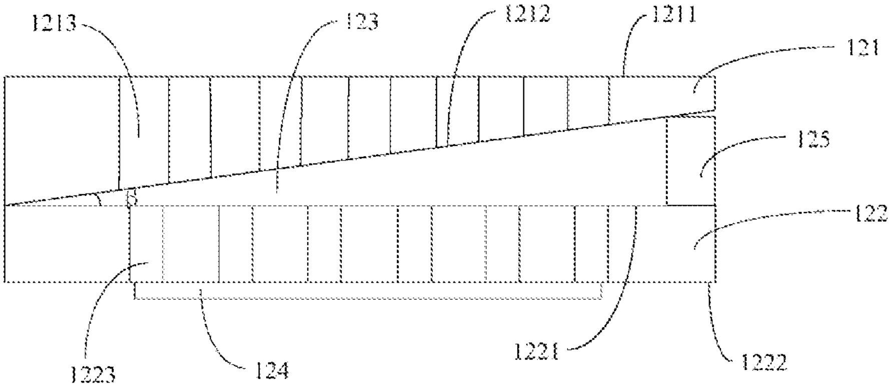
FIG. 12 is a schematic structural diagram of a sixth embodiment of a heating assembly according to this application.

Referring to FIG. 12, FIG. 12 is a schematic structural diagram of a sixth embodiment of a heating assembly according to this application.

A difference between the sixth embodiment of the heating assembly 12 and the first embodiment of the heating assembly 12 lies in that: in the first embodiment of the heating assembly 12, the first surface 1211 of the first substrate 121 is not parallel to the fourth surface 1222 of the second substrate 122, but in the sixth embodiment of the heating assembly 12, the first surface 1211 of the first substrate 121 is parallel to the fourth surface 1222 of the second substrate 122; and arrangement manners of other structures in the sixth embodiment of the heating assembly 12 are all the same as those in the first embodiment of the heating assembly 12, which are not described herein again.

It may be understood that, the first surface 1211 is set to be parallel to the fourth surface 1222, which helps assemble the fixing member 126 and assemble the heating assembly 12 on the vaporization base 11.

In an implementation, both the first surface 1211 and the second surface 1212 of the first substrate 121 are flat surfaces, both the third surface 1221 and the fourth surface 1222 of the second substrate 122 are flat surfaces, the first surface 1211 is parallel to the fourth surface 1222, and the second surface 1212 and/or the third surface 1221 are inclined surfaces, so that the gap 123 formed between the second surface 1212 and the third surface 1221 is gradually increased. As shown in FIG. 12, the first surface 1211 is parallel to the fourth surface 1222, and the second surface 1212 is an inclined surface.

Figure 13:
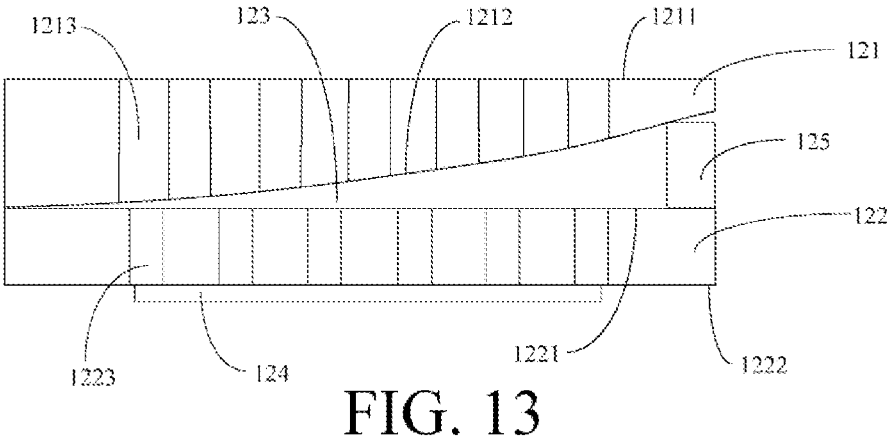
FIG. 13 is a schematic structural diagram of another implementation of a first substrate and a second substrate in a sixth embodiment of a heating assembly according to this application.

Referring to FIG. 13, FIG. 13 is a schematic structural diagram of another implementation of a first substrate and a second substrate in a sixth embodiment of a heating assembly according to this application. In another implementation, the first surface 1211 of the first substrate 121 is a flat surface, the fourth surface 1222 of the second substrate 122 is a flat surface, the first surface 1211 is parallel to the fourth surface 1222, and the second surface 1212 of the first substrate 121 and/or the third surface 1221 of the second substrate 122 are curved surfaces, so that the gap 123 formed between the second surface 1212 and the third surface 1221 is gradually increased. As shown in FIG. 13, the first surface 1211 is parallel to the fourth surface 1222, and the second surface 1212 is a curved surface.

Figure 14:
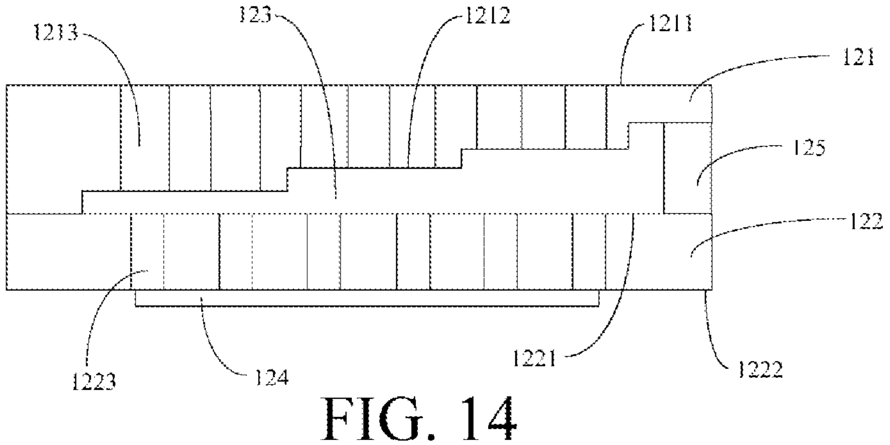
FIG. 14 is a schematic structural diagram of still another implementation of a first substrate and a second substrate in a sixth embodiment of a heating assembly according to this application.

Referring to FIG. 14, FIG. 14 is a schematic structural diagram of still another implementation of a first substrate and a second substrate in a sixth embodiment of a heating assembly according to this application. In still another implementation, the first surface 1211 of the first substrate 121 is a flat surface, the fourth surface 1222 of the second substrate 122 is a flat surface, the first surface 1211 is parallel to the fourth surface 1222, and the second surface 1212 of the first substrate 121 and/or the third surface 1221 of the second substrate 122 are step surfaces, so that the gap 123 formed between the second surface 1212 and the third surface 1221 is gradually increased. As shown in FIG. 14, the first surface 1211 is parallel to the fourth surface 1222, and the second surface 1212 is a step surface.

Figure 15:
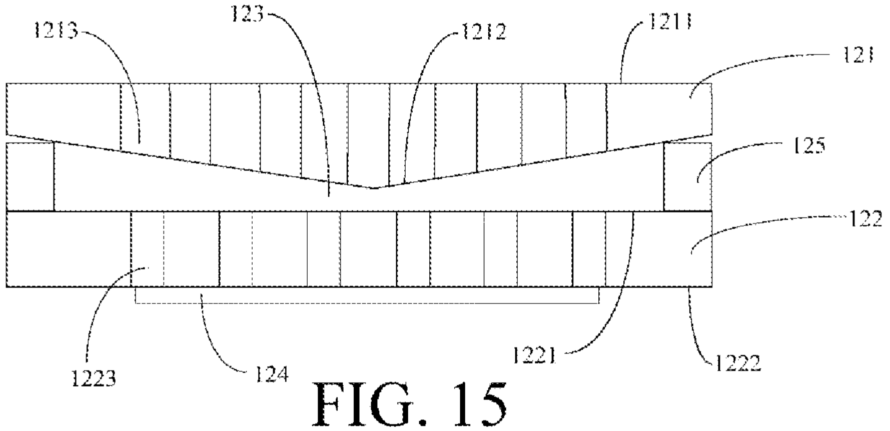
FIG. 15 is a schematic structural diagram of a seventh embodiment of a heating assembly according to this application.

Referring to FIG. 15, FIG. 15 is a schematic structural diagram of a seventh embodiment of a heating assembly according to this application.

A difference between the seventh embodiment of the heating assembly 12 and the first embodiment of the heating assembly 12 lies in that: in the first embodiment of the heating assembly 12, the height of the gap 123 is gradually increased, but in the seventh embodiment of the heating assembly 12, the height of the gap 123 is first gradually decreased and then gradually increased; and arrangement manners of other structures in the seventh embodiment of the heating assembly 12 are all the same as those in the first embodiment of the heating assembly 12, which are not described herein again.

In this embodiment, the first surface 1211 of the first substrate 121 is a flat surface, the fourth surface 1222 of the second substrate 122 is a flat surface, and the first surface 1211 is parallel to the fourth surface 1222. One of the second surface 1212 of the first substrate 121 and the third surface 1221 of the second substrate 122 is a bended surface, and the other is a flat surface, so that the height of the gap 123 formed between the second surface 1212 and the third surface 1221 is first gradually decreased and then gradually increased. That is, the height of the gap 123 formed between the second surface 1212 and the third surface 1221 is gradually increased from a middle part to two sides or the surrounding (as shown in FIG. 15).

In some other embodiments, the first surface 1211 may not be parallel to the fourth surface 1222. At a place where the height of the gap 123 is smallest, the second surface 1212 may be or may not be in contact with the third surface 1221. One of the second surface 1212 and the third surface 1221 is a flat surface, and the other is a step surface or a cambered surface, provided that the height of the gap 123 can be first gradually decreased and then gradually increased, which are specifically designed as required.

It should be noted that, features of the heating assembly 12 provided in the foregoing embodiments may be combined as required, and all combinations fall within the protection scope of this application.

The foregoing descriptions are merely implementations of this application, and the patent scope of this application is not limited thereto. All equivalent structure or process changes made according to the content of this specification and the accompanying drawings in this application or by directly or indirectly applying this application in other related technical fields shall fall within the protection scope of this application.

What is claimed is:

1. A heating assembly for an electronic vaporization device having an aerosol-generation substrate, comprising:

a first substrate, comprising a first surface and a second surface arranged opposite to each other; and a second substrate, comprising a third surface and a fourth surface arranged opposite to each other, wherein:

the second surface and the third surface are arranged opposite to each other to form a gap having a capillary effect and a gradually changing height from a first end of the gap to a second end of the gap, an edge of the first substrate is provided with a liquid inlet formed thereon or by the edge of the first substrate with another component, the gap communicates the plurality of second micropores and the liquid inlet, and the second substrate comprises a plurality of second micropores configured to guide the aerosol-generation substrate from the gap to the fourth surface.

2. The heating assembly according to claim 1, wherein:

the first substrate comprises a plurality of first micropores configured to guide the aerosol-generation substrate from the first surface to the second surface, and the gap communicates the plurality of first micropores and the plurality of second micropores.

3. The heating assembly according to claim 1, wherein:

the second substrate comprises a vaporization region and a non-vaporization region, and the heating assembly further comprises a heating component arranged on the fourth surface and corresponding to the vaporization region to heat and vaporize the aerosol-generation substrate.

4. The heating assembly according to claim 1, wherein:

the second substrate comprises a vaporization region and a non-vaporization region, and at least a part of the vaporization region of the second substrate comprises a conductive function to heat and vaporize the aerosol-generation substrate.

5. The heating assembly according to claim 1, wherein the height of the gap corresponding to the vaporization region is less than 30 μm.

6. The heating assembly according to claim 5, wherein the height of the gap corresponding to the vaporization region is less than 5 μm.

7. The heating assembly according to claim 5, wherein the third surface is provided with a groove structure, and the height of the gap corresponding to the vaporization region is less than 30 μm.

8. The heating assembly according to claim 5, wherein the third surface is a flat surface and the height of the gap is less than 20 μm.

9. The heating assembly according to claim 1, wherein both the second surface and the third surface are flat surfaces; or one of the second surface and the third surface is a flat surface, and the other is a curved surface; or one of the second surface and the third surface is a flat surface, and the other is a step surface.

10. The heating assembly according to claim 1, wherein:

the first substrate has a first direction and a second direction that are perpendicular to each other, the height of the gap is gradually increased in the first direction, and the edge of the first substrate is provided with two liquid inlets disposed on two opposite sides of the first substrate in the first direction or in the second direction.

11. The heating assembly according to claim 1, further comprising at least a spacer arranged between the second surface and the third surface and at at least one of the edge of the first substrate and an edge of the second substrate, wherein the first substrate and the second substrate are arranged opposite to each other to form the gap.

12. The heating assembly according to claim 11 wherein the spacer is a gasket; or the spacer is a support column, a support frame, or a coating fixed to the second surface and/or the third surface; or the spacer is a protrusion integrally formed with the first substrate and/or the second substrate.

13. The heating assembly according to claim 11, wherein the first substrate abuts against an edge of one end of the second substrate, and the spacer is arranged between the first substrate and an edge of the other end of the second substrate.

14. The heating assembly according to claim 11, wherein the spacers respectively arranged at the edges of the first substrate and the second substrate have different heights.

15. The heating assembly according to claim 1 wherein:

the spacer comprises a plurality of first sub-spacers and a plurality of second sub-spacers, heights of the plurality of first sub-spacers and the plurality of second sub-spacers are different, the plurality of first sub-spacers are spaced and arranged at one of an edge of one end of the first substrate and an edge of one end of the second substrate, and the plurality of second sub-spacers are spaced and arranged at one of an edge of the other end of the first substrate and an edge of the other end of the second substrate.

16. The heating assembly according to claim 1, further comprising:

a fixing member having a liquid supplying hole; and a fixing structure arranged on a wall of the liquid supplying hole to fix at least one of the first substrate and the second substrate so that the first substrate and the second substrate form the gap, wherein at least a part of the edge of the first substrate and the wall of the liquid supplying hole are spaced to form the liquid inlet, and the second substrate crosses the liquid supplying hole.

17. The heating assembly according to claim 2, wherein the plurality of second micropores have a capillary force greater than a capillary force of the plurality of first micropores.

18. The heating assembly according to claim 2, wherein the plurality of second micropores are straight through holes running through the third surface and the fourth surface.

19. The heating assembly according to claim 18, wherein the plurality of first micropores are straight through holes running through the first surface and the second surface.

20. The heating assembly according to claim 19, wherein a pore size of each of the plurality of first micropores ranges from 10 μm to 150 μm.

21. The heating assembly according to claim 1, wherein the liquid inlet includes a through hole disposed on the edge of the first substrate.

22. The heating assembly according to claim 1, wherein both the first substrate and the second substrate are plate structures, and a thickness of the first substrate ranges from 0.1 mm to 1 mm, and a thickness of the second substrate ranges from 0.1 mm to 1 mm.

23. A vaporizer, comprising:

a liquid storage cavity, configured to store an aerosol-generation substrate; and a heating assembly, comprising:

a first substrate, comprising a first surface and a second surface arranged opposite to each other; and a second substrate, comprising a third surface and a fourth surface arranged opposite to each other, wherein:

the second surface and the third surface are arranged opposite to each other to form a gap having a capillary effect and a gradually changing height from a first end of the gap to a second end of the gap, an edge of the first substrate is provided with a liquid inlet formed thereon or by the edge of the first substrate with another component, the gap communicates the plurality of second micropores and the liquid inlet, and the second substrate comprises a plurality of second micropores configured to guide the aerosol-generation substrate from the gap to the fourth surface.

24. An electronic vaporization device, comprising:

a vaporizer including a liquid storage cavity configured to store an aerosol-generation substrate and a heating assembly; and a main unit configured to supply electric energy for operation of the vaporizer and control the heating assembly to vaporize the aerosol-generation substrate, wherein the heating assembly comprises:

a first substrate, comprising a first surface and a second surface arranged opposite to each other, and a second substrate, comprising a third surface and a fourth surface arranged opposite to each other, wherein:

the second surface and the third surface are arranged opposite to each other to form a gap having a capillary effect and a gradually changing height from a first end of the gap to a second end of the gap, an edge of the first substrate is provided with a liquid inlet formed thereon or by the edge of the first substrate with another component, the gap communicates the plurality of second micropores and the liquid inlet, and the second substrate comprises a plurality of second micropores configured to guide the aerosol-generation substrate from the gap to the fourth surface.

* * * * *